(12) United States Patent
Knighton et al.

(10) Patent No.: US 8,414,207 B1
(45) Date of Patent: Apr. 9, 2013

(54) ULTRA-COMPACT MOBILE TOUCH-TYPE KEYBOARD

(75) Inventors: Mark S. Knighton, Santa Monica, CA (US); Mydul R. Islam, Van Nuys, CA (US); Tzyy-Woei R. Sung, Buena Park, CA (US); J. Douglas Logan, Cerritos, CA (US); Kevin H. Vuong, Baldwin Park, CA (US)

(73) Assignee: Synerdyne Corporation, Santa Monica, CA (US)

( * ) Notice: Subject to any disclaimer, the term of this patent is extended or adjusted under 35 U.S.C. 154(b) by 0 days.

(21) Appl. No.: 13/366,221

(22) Filed: Feb. 3, 2012

(51) Int. Cl.
*G06F 3/02* (2006.01)

(52) U.S. Cl.
USPC ........... 400/485; 400/489; 400/490; 400/495; 400/496

(58) Field of Classification Search .................. 400/472, 400/473, 480, 490, 492, 496, 485, 489
See application file for complete search history.

(56) References Cited

U.S. PATENT DOCUMENTS

| | | | |
|---|---|---|---|
| 2,532,228 A | 11/1950 | Hesh |
| 3,399,287 A | 8/1968 | Euler |
| 3,633,724 A | 1/1972 | Samuel |
| 4,201,489 A | 5/1980 | Zapp |
| 4,256,931 A | 3/1981 | Palisek |
| 4,440,515 A | 4/1984 | Nassimbene |
| 4,449,839 A | 5/1984 | Bleuer |
| 4,536,625 A | 8/1985 | Bebie |
| 4,584,443 A | 4/1986 | Yaeger |
| 4,654,647 A | 3/1987 | Wedam |
| 4,719,455 A | 1/1988 | Louis |
| 4,761,522 A | 8/1988 | Allen |
| 4,778,295 A | 10/1988 | Bleuer |
| 4,896,003 A | 1/1990 | Hsieh |
| 4,913,573 A | 4/1990 | Retter |
| 4,935,728 A | 6/1990 | Kley |
| 5,012,230 A | 4/1991 | Yasuda |
| 5,017,030 A | 5/1991 | Crews |
| 5,086,296 A | 2/1992 | Clark |
| 5,087,910 A | 2/1992 | Guyot-Sionnest |
| 5,252,952 A | 10/1993 | Frank et al. |
| 5,383,735 A | 1/1995 | Smiley |
| 5,424,516 A | 6/1995 | Emmons |

(Continued)

FOREIGN PATENT DOCUMENTS

| | | |
|---|---|---|
| EP | 1223501 | 7/2002 |
| JP | 2003288153 A | * 10/2003 |

(Continued)

OTHER PUBLICATIONS

USRobotics keyboard 5502, Model 5502 Mini Bluetooth Keyboard, Aug. 24, 2011, USRobotics data sheet.*

(Continued)

*Primary Examiner* — Daniel J Colilla
(74) *Attorney, Agent, or Firm* — Blakely, Sokoloff, Taylor & Zafman LLP

(57) ABSTRACT

An ultra compact mobile keyboard. The keyboard has a plurality of mechanical keys suitable for touch typing. Each such key has a travel distance sufficient to provide a touch type feel and a rigid cap for crisp actuation by a user. The keyboard has a deployed configuration for touch-typing use and a collapsed configuration for transport and storage. In the collapsed configuration, the keyboard fits within bounding volume of less than 180 cubic centimeters.

11 Claims, 20 Drawing Sheets

U.S. PATENT DOCUMENTS

| | | |
|---|---|---|
| 5,424,728 A | 6/1995 | Goldstein |
| 5,497,151 A | 3/1996 | Dombroski |
| 5,504,502 A | 4/1996 | Arita et al. |
| 5,528,235 A | 6/1996 | Lin et al. |
| 5,564,560 A | 10/1996 | Minelli |
| 5,661,505 A | 8/1997 | Livits |
| 5,666,138 A | 9/1997 | Culver |
| 1,652,464 A | 12/1997 | Tyberg |
| 5,790,108 A | 8/1998 | Salcudean et al. |
| 5,808,603 A | 9/1998 | Chen |
| 5,841,374 A | 11/1998 | Abraham |
| 5,841,635 A | 11/1998 | Sadler et al. |
| 6,031,469 A | 2/2000 | Dodd |
| 6,046,754 A | 4/2000 | Stanek |
| 6,075,522 A | 6/2000 | Milroy |
| 6,103,979 A | 8/2000 | Motoyama et al. |
| 6,157,323 A | 12/2000 | Tso et al. |
| 6,168,331 B1 | 1/2001 | Vann |
| 6,204,839 B1 | 3/2001 | Mato |
| 6,230,222 B1 | 5/2001 | Rush |
| 6,307,537 B1 | 10/2001 | Oowada |
| 6,348,878 B1 | 2/2002 | Tsubai |
| 6,386,773 B1 | 5/2002 | Mathias |
| 6,417,838 B1 | 7/2002 | Inamura |
| 6,437,682 B1 | 8/2002 | Vance |
| 6,520,699 B2 | 2/2003 | Abe |
| D473,226 S | 4/2003 | Griffin |
| 6,594,142 B2 | 7/2003 | Katz |
| 6,798,649 B1 * | 9/2004 | Olodort et al. ........... 361/679.13 |
| 6,869,239 B2 * | 3/2005 | Morris ........................ 400/488 |
| 7,202,853 B2 | 4/2007 | Ng et al. |
| 7,310,053 B2 * | 12/2007 | Bollman ........................ 341/22 |
| 7,401,300 B2 | 7/2008 | Nurmi |
| 2001/0006587 A1 | 7/2001 | Keinonen et al. |
| 2002/0037715 A1 | 3/2002 | Mauney et al. |
| 2002/0085337 A1 | 7/2002 | Rubenson et al. |
| 2002/0149566 A1 | 10/2002 | Sarkissian |
| 2003/0099086 A1 | 5/2003 | Chuang |
| 2003/0193478 A1 | 10/2003 | Ng et al. |
| 2003/0197685 A1 | 10/2003 | Yi |
| 2004/0061683 A1 * | 4/2004 | Mochizuki et al. ........... 345/168 |
| 2004/0183785 A1 | 9/2004 | Liu et al. |
| 2004/0190968 A1 | 9/2004 | Yang |
| 2005/0002158 A1 | 1/2005 | Olodort et al. |
| 2005/0123333 A1 | 6/2005 | Sugimura et al. |
| 2005/0140653 A1 | 6/2005 | Pletikosa et al. |
| 2006/0088356 A1 * | 4/2006 | Jawerth et al. ................ 400/472 |
| 2007/0008291 A1 | 1/2007 | Liu |
| 2007/0268261 A1 * | 11/2007 | Lipson .......................... 345/169 |
| 2007/0279388 A1 | 12/2007 | Pletikosa et al. |
| 2009/0033628 A1 | 2/2009 | Srivastava |
| 2009/0257807 A1 * | 10/2009 | Woloschyn ................... 400/489 |
| 2009/0309616 A1 | 12/2009 | Klinghult et al. |
| 2010/0073302 A1 | 3/2010 | Ritzau et al. |
| 2010/0254111 A1 | 10/2010 | Ligtenberg et al. |
| 2011/0031287 A1 | 2/2011 | Le Gette et al. |
| 2011/0170250 A1 * | 7/2011 | Bhutani et al. ............. 361/679.2 |

FOREIGN PATENT DOCUMENTS

| | | |
|---|---|---|
| WO | WO-0239701 | 5/2002 |
| WO | WO-02101531 | 12/2002 |
| WO | WO-03007143 | 1/2003 |

OTHER PUBLICATIONS

USRobotics Introduces New Tablet Accessories, Worlwide Computer Products News, Normans Media Ltd., Gale, Cengage Learning, Sep. 9, 2011.*

* cited by examiner

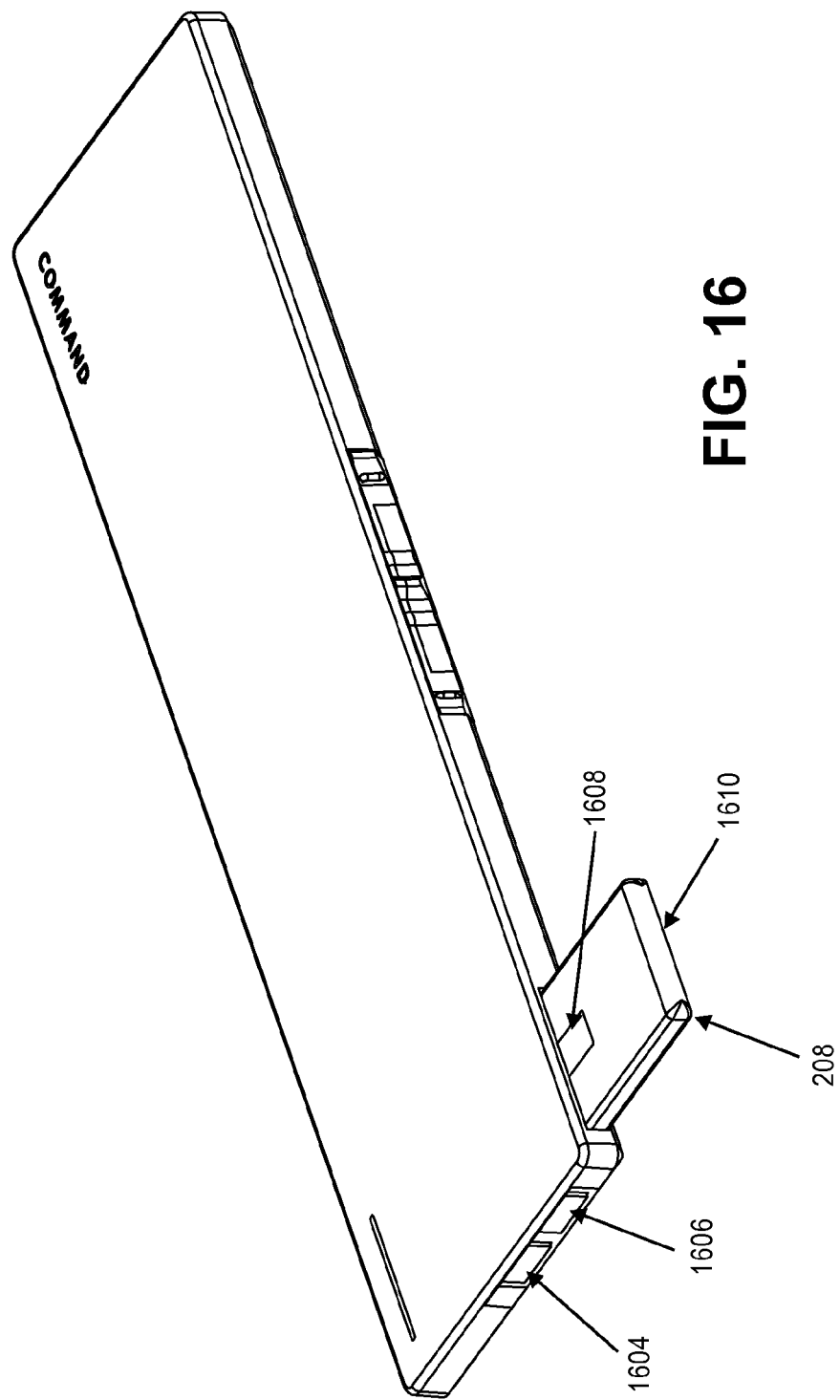

ULTRA-COMPACT MOBILE TOUCH-TYPE KEYBOARD

BACKGROUND

1. Field of the Invention

Embodiments of the invention relate to a keyboard. More specifically, embodiments of the invention relate to a compact, portable, wireless keyboard for use with mobile devices.

2. Background

Portable devices such as smartphones like the Iphone™ and Android™-based phones, as well as tablet computers such as the iPad™, have become ubiquitous and their market share in the overall computing field has continued to grow. A dominant complaint of users of such devices is the absence of a real keyboard for efficient typing. Efforts to address this problem have followed two general tracks: (i) repurposing existing compact keyboards to interface with these devices or (ii) creating compact "candy bar" keyboards, which are unsuitable for touch-typing. A problem with the first track is that the resultant keyboard is often bigger than the device for which it is designed to operate. As a mobile office option, this results in the tablet-keyboard combination being inferior to available laptops as the marginal gain in smaller size and weight is insufficient when compared to the functionality and computing power of available laptops. In the second case, shrunken form-factor keyboards are not satisfactory for touch-typing. While they will generally have keys arranged in a touch-typing format such as QWERTY, their physical size renders touch-typing impossible. It would therefore be desirable to develop a compact keyboard suitable for touch-typing.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 16 is a perspective view of the spacebar with the beam partially inserted.

DETAILED DESCRIPTION

Figure 1:
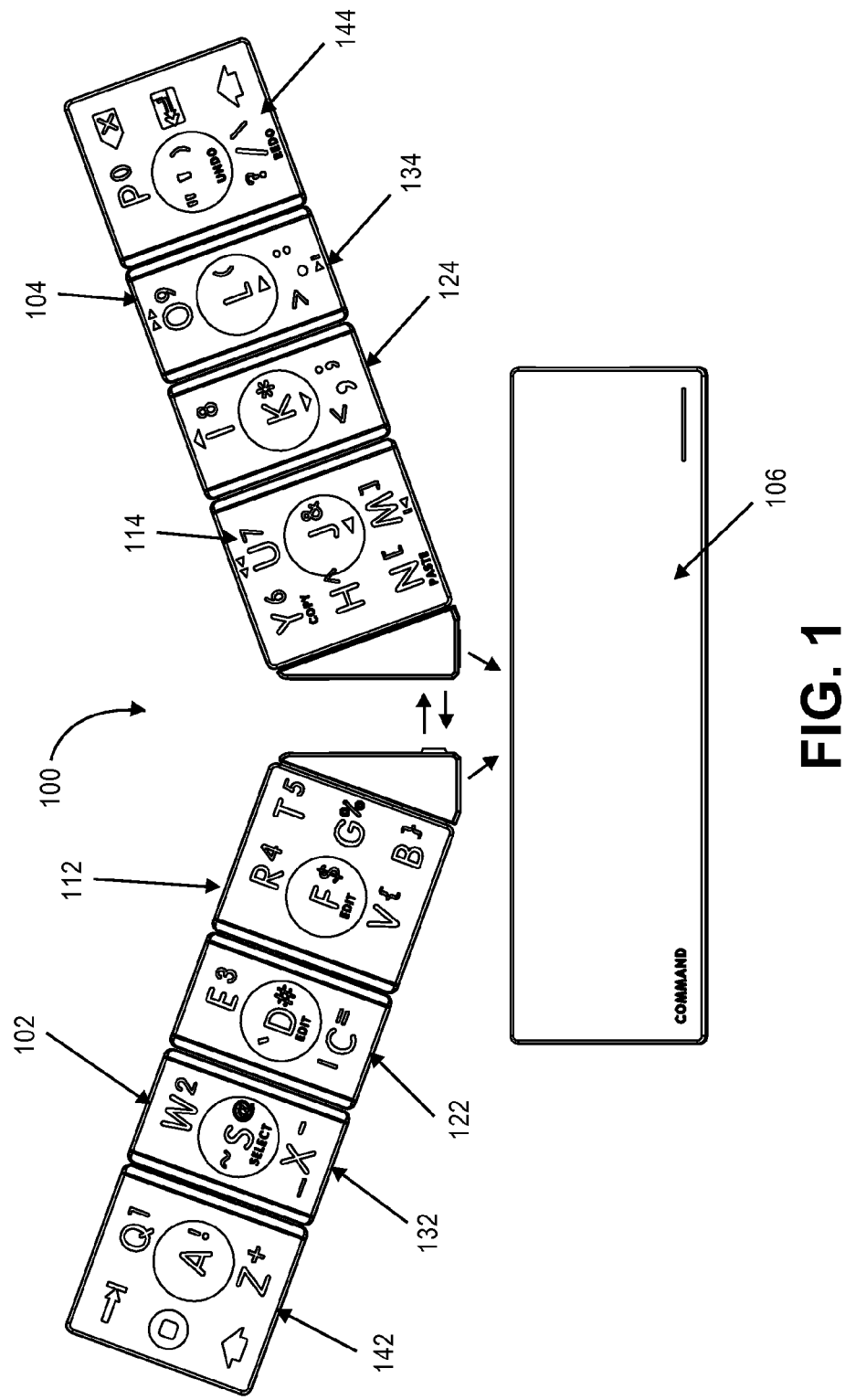
FIG. 1 is a diagram of one embodiment of the invention with elements dissociated.

FIG. 1 is a diagram of one embodiment of the invention with elements dissociated. Keyboard 100 includes three physically dissociable elements; two key arrays 102, 104, and a spacebar 106. A first array of keys 102 and a second array of keys 104 are dissociable from each other as well as a third element, spacebar 106, that provides spacebar functionality to the keyboard 100. In the shown embodiment, the first array of keys 102 has four keys described by the letters on their faces: "RTFGVB" key 112, "EDC" key 122, "WSX" key 132 and "QAZ" key 142. Key array 104 also has four keys: "YUHJNM" key 114, "IK" key 124, "OL" key 134 and "P" key 144. Touch typists will recognize that the letters or functions associated with each key are those actuated by an individual finger during touch-typing. While the mapping in this FIG. 1 follows the scheme of a QWERTY touch-typing keyboard, any other touch-typing mapping may be employed.

Thus, the left index finger actuates key 112, the left middle finger actuates the functions of key 122, the left ring finger actuates the functions of key 132 and the left little finger actuates the functions of key 142 when a user is touch-typing with keyboard 100. Similarly, the right index finger actuates the functions of key 114, the right middle finger actuates the functions of key 124, the right ring finger actuates key 134 and the right little finger actuates key 144. The functions associated with each respective key are the same as would be actuated by the corresponding finger in the touch-typing system employed (in this example QWERTY). In one embodiment, a tactile feature such as a raised area or concave area denotes the "home row" location for each finger. While in this embodiment 8 total keys are employed, embodiments of the invention may have more or fewer physical keys. For example, in one embodiment keys 122 and 132 could be combined into a single larger physical key. In another embodiment for example the larger keys such as key 112 may be rendered as two keys for example an "RFV" key and a "TGB" key.

In one embodiment, magnetic masses are disposed within each of dissociable elements 102, 104, 106 such that the magnetic forces there between draw dissociable elements together to form a unitary keyboard. As used herein, "magnetic mass" includes permanent magnets and masses comprising magnetic material upon which a magnet may exert an attractive force. In one embodiment, rare-earth magnets are disposed in each of dissociable elements 102 and 104, and a steel mass to which those rare earth permanent magnets may magnetically attract is disposed in dissociable element 106. Applying sufficient force to overcome the respective magnetic attractions can disassociate the different elements. In one embodiment a force of about one pound will result in disassociation of the elements. Use of stronger or weaker magnets is contemplated as within the scope of different embodiments of the invention. In one embodiment, when the magnets draw the dissociable elements together the device is automatically activated.

In an alternative embodiment, elements 102, 104 and 106 interconnect using any form of conventional electrical interconnection, including male/female connectors. In one embodiment, wire leads may be used to interconnect the three elements. In still a further embodiment, the dissociable elements need not be interconnected for operation. Rather, each dissociable element 102, 104, 106 includes a wireless signaling module, such as a Bluetooth™ module, which permits them to intercommunicate and/or communicate individually directly with a host. In one such embodiment, the key arrays can be powered by a near field transponder resident in the spacebar. Such a transponder could comprise a near field communication (NFC) chip that is operated by radio waves emitted by another of the dissociable elements or the host. Electromagnetic waves emitted by one element may be received inductively and converted into usable power to supply another element.

Figure 2:
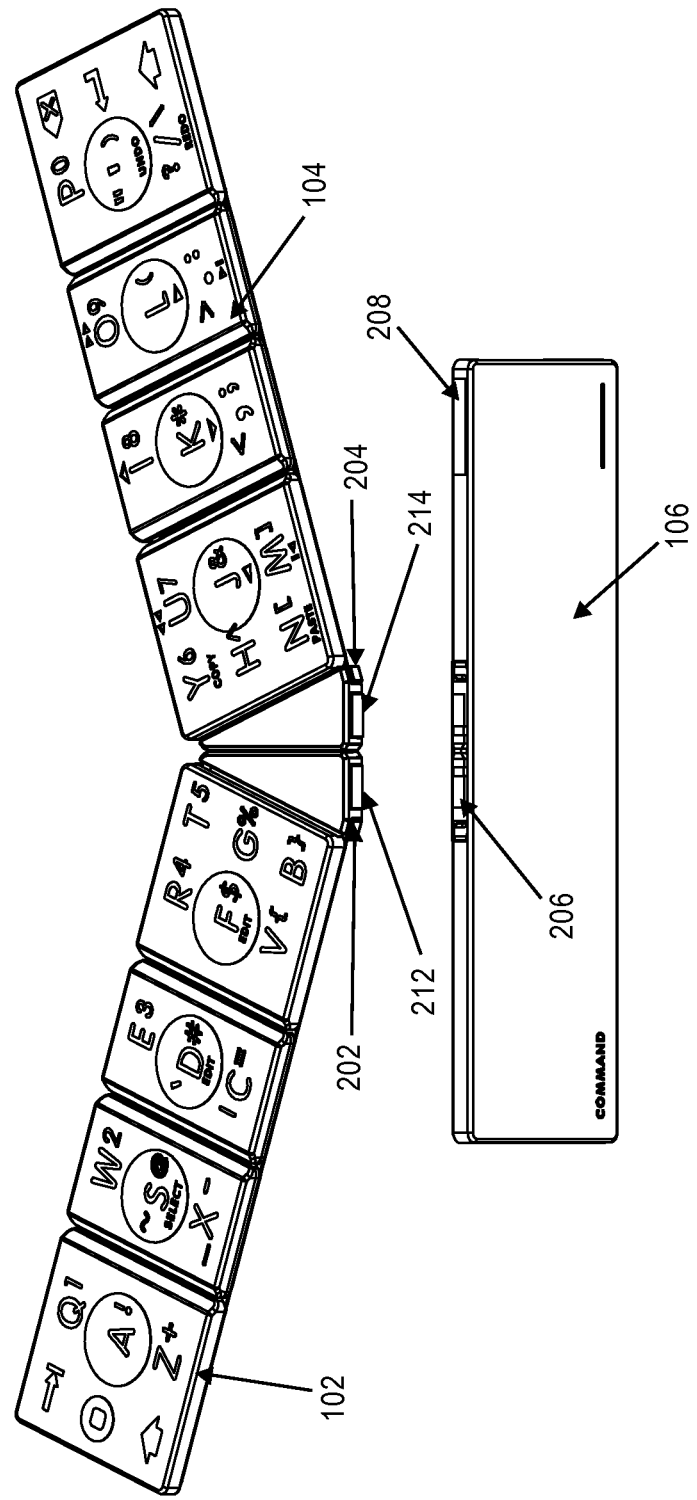
FIG. 2 is a diagram of the keyboard of FIG. 1 rotated to expose the magnetic masses.

FIG. 2 is a diagram of the keyboard of FIG. 1 rotated to expose the magnetic masses. Array 102 and array 104 are coupled together by permanent magnets (not shown). Additionally, array 102 includes magnet 202 and magnet 212 which are attracted to magnetic mass 206 in spacebar 106. Similarly, key array 104 includes magnets 214 and 204, which are also attracted to magnetic mass 206. Magnets 212 and 214 in key arrays 102 and 104 respectively, are arranged to expose opposite magnetic fields, e.g. 214 may expose a north polarity and 212 a south polarity or vice versa. In one embodiment all of the permanent magnets are rare-earth magnets. As discussed in more detail below, magnetic mass 206 has a topology to ensure a strong magnetic attraction between key array 102, key array 104 and spacebar 106.

In this embodiment, magnet pairs 202, 212 and 214, 204 each form a power and ground path such that a battery (not shown in this figure) in the spacebar 106 can power the operation of both key arrays 102, 104. Moreover, the magnetic coupling between the two key arrays serves to provide a redundant power connection so that if one power path fails, the array can source its power through the adjacent array. In addition to forming the power path, the magnetic interconnection also forms the signaling path by which data is passed from each key array to the spacebar 106 for transmission to a recipient device. By electronically disconnecting power, the same path may momentarily be used to transmit data back and forth, without additional connections. This data may include keyboard array data, such as key press events and the values associated therewith for interpretation by a processor (not shown in this figure) within the spacebar.

For example in one embodiment, magnets 212, 214 provide ground and remain connected both while providing power and when signaling. Magnets 202, and 204 are connected through a switch to a power source in the spacebar 106. The power charges a capacitor in each of the arrays 102 and 104. These capacitors are used to power the respective arrays 102, 104 while the switch disconnects the power to magnets 202 and 204 so that they can alternately be used as a signal path. Unlike a conventional power line modem, the power is actually disconnected during signaling rather than simply modulating its voltage with the data signal In this example, if e.g. the J function is activated, the array 104 generates a "make code" for key 114 and a location code indicative of the user's finger position when the key was depressed. When the key is released a "break" code is generated. In some embodiments, the array 104 may also predict the "J" and include a J prediction code. These codes are buffered in the array 104 until a sending opportunity arises. In one embodiment, for a given key function, these codes may amount to approximately ten bytes of data.

In one embodiment, the spacebar 106 periodically disconnects the power (via the switch) and listens for data from the arrays 102, 104. The codes are sent to the spacebar using, in one embodiment non-return-to-zero encoding (NRZ) at a 100 kHz bit rate. The processor (not shown in this figure) in the spacebar 106 interprets the incoming codes and sends out (in this example) a "J make" and then a "J break" code to the recipient device via a wireless link. The prediction code (if supplied) may be compared with information known to the spacebar 106 (but not necessarily to the array 104) such as different command modes etc. In the case that a different mode is operative, the spacebar 106 generates the appropriate codes to forward along to the recipient to generate the expected function.

Additionally, the spacebar 106 ensures that the battery power will be reconnected before the droop in the capacitor voltage would result in loss of power in the array 102,104. In one embodiment, the array 102, 104 requires about three mA for normal operation. In one such embodiment, the spacebar 106 prevents signaling longer than 3 ms, to assure that the capacitor voltage does not droop too far. At 100 kHz, 1 bit is sent every 10 μs. Each 8 bit byte of data, requires ten bits to be sent (due to overhead). This permits thirty bytes of data to be transmitted in each three ms slot. These 3 ms slots are fit in between charging periods, which should not exceed five ms to avoid excessive droop. In this example, each time the spacebar 106 provides battery power to charge the arrays, it should do so for at least 0.5 ms to insure sufficient charge in the capacitors to avoid excessive droop during a transmission slot.

Each time the spacebar 106 signals an array 102,104, the array 102, 104 responds back with an acknowledgement that it has received an accurate copy of the data, and the array 102, 104 also delivers any key code data it may have. The spacebar 106 checks to confirm that the response was valid, and the process repeats. When the spacebar 106 finishes signaling the array 102, 104, the spacebar 106 connects the power line to battery power for 0.5 ms to recharge the capacitors in the arrays 102, 104. After this, the spacebar 106 disconnects battery power. When the array 102, 104 detects the end of the spacebar 106 signaling, it drives the power line to a logical high level for 0.8 ms. This logic high overlaps with the 0.5 ms charge time, and remains active for about 0.3 ms after the charge period (varies based on the relative precision of the clocks in the spacebar 106 and arrays 102, 104). The 0.3 ms window establishes a quiet period prior to the start of the array 102, 104 signaling its data to the spacebar. The array 102, 104 then signals the spacebar 106 for up to 3 ms. At the end of the array 102, 104 signaling, the array 102, 104 sets the power line to a logic high level for 0.3 ms to insure a clean handoff of control back to the spacebar 106. Also at the end of the array 102, 104 signaling, the spacebar 106 reconnects the battery to the power line for the next 0.5 ms charge period, and the process repeats for the next set of data back and forth. In one embodiment, the spacebar 106 is master of the communication, and sequentially addresses each array 102 and 104 so as to prevent contention of responses.

Figure 3:
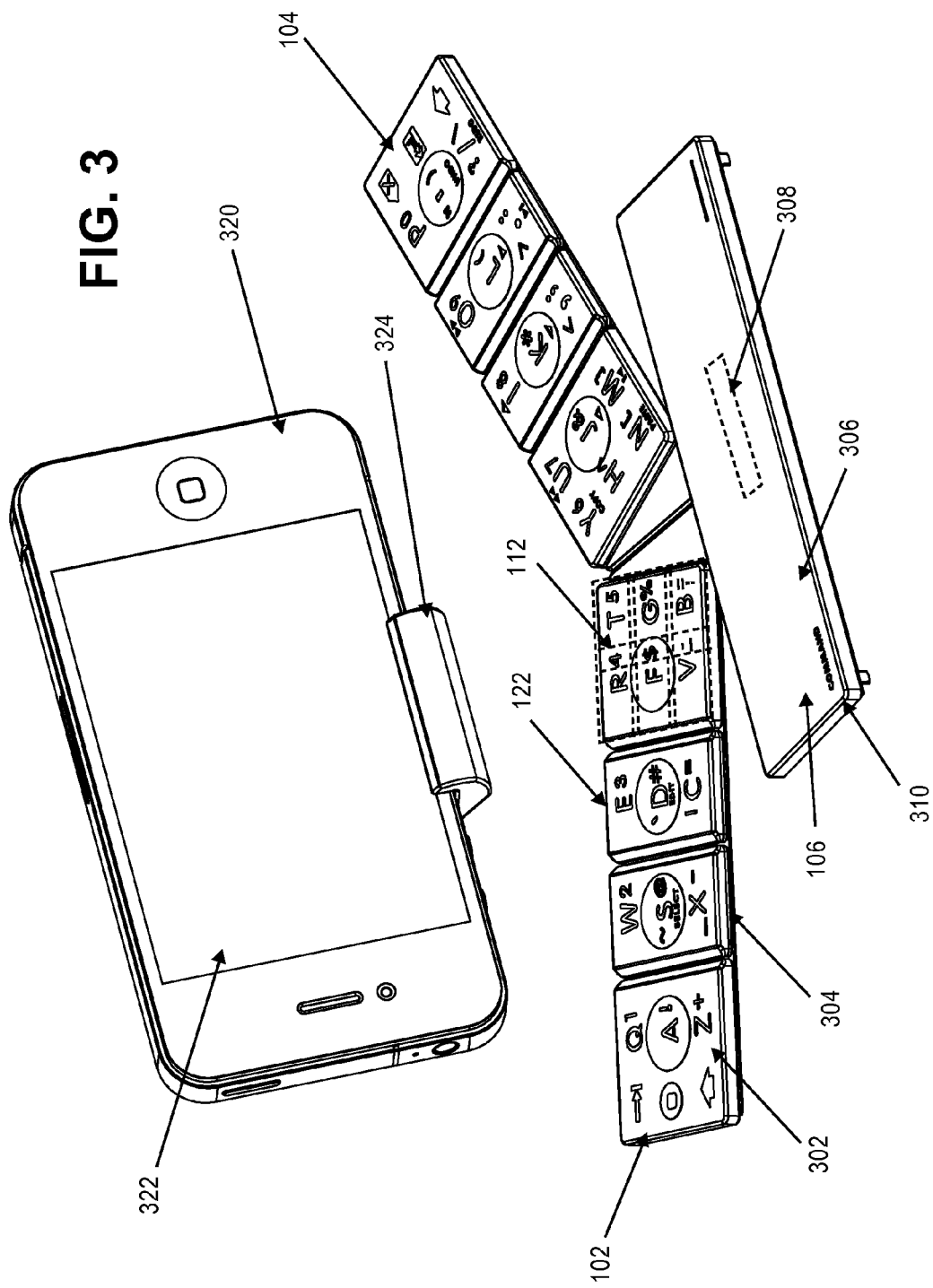
FIG. 3 is a diagram of a system of one embodiment of the invention.

FIG. 3 is a diagram of a system of one embodiment of the invention. A recipient device 320 having a display 322 is retained at a desirable work angle by a dual function stand/clip 324. Recipient device 322 may be a smartphone or tablet computer. It is also envisioned that the keyboard of the embodiments in the instant invention may be used with desktop computers or with any other electronic device for which a keyboard is desirable. "Recipient" as used here in is deemed to include any device that receives inputs from the keyboard. As explained in more detail below, in addition to functioning as a stand for a recipient device 320, clip 324 provides a stowage holder for the disassembled keyboard.

The key array 102, key array 104 and spacebar 106 are all individually and collectively frameless. This reduces the space required to supply the keyboard functionality. Once assembled, as shown, the keyboard has an "underlined V" shape. This underlined V-shape provides greater ergonomic comfort in reduced space relative to conventional keyboards comprised of staggered linear rows of buttons. Nevertheless other embodiments of the invention may occupy greater space and have a standard linear arrangement. In one embodiment, assembling the device turns it on and disassembling the device turns it off. As discussed below, some functions (such as automatic login) may be enabled when the device is assembled.

The keys on each array 102, 104 are formed of individual keycaps 302 and a key base 304 that forms a substrate for all keys of the array. Thus, in the embodiment shown in FIG. 3, there are eight keycaps 302 (four each for key array 102 and key array 104) and two key base substrates (one each for key array 102 and 104). In this embodiment, there are 2 different sizes of keycaps; one for large keys such as key 112 and one for smaller keys such as key 122. In one embodiment, keycaps 302 and key bases 304 are injection-molded from a thermoplastic. In one embodiment, they are molded from polycarbonate.

Each key is associated with at least three primary functions. For example, key 112 is associated with R, T, F, G, V and B as its primary letter functions. Each key is spaced at 19 mm from its neighboring key, consistent with international standards for touch-typing. The character legends on a single key are closer together to reduce the throw distance for the character selections by a same single finger. Tests indicate this reduced throw lessens the physical work and contributes to faster touch-typing. In one embodiment, zones, which may overlap, are defined on each key such that actuation of the key by a finger within the zone triggers the actuation of the associated function. For example, pressing the lower right hand corner of key 112 would fall within the B zone and result in the key event actuating the B function. The zones may overlap somewhat and a processor within the key array may interpret intent of the finger-press based on the percentage of the contact that falls within a particular zone. Because of the risk of accidental actuation of more than one function when a finger overlaps two zones, the processor interprets any arbitrary combination of readings from one or more zones on any physical key into a single unique function. While key 112 is shown as having six zones, keys such as key 122, which has only three primary functions E, D and C, may have only three zones. In one embodiment, capacitive sensors within the substrate 304 sense the zone or zones of contact and that information is interpreted by a processor within the array. In one embodiment, the internal processor may dynamically adjust the size of a zone associated with a function or the weighting of the readings associated with that same function. Such dynamic adjustments to the interpretation by the processor may also be based on one or more prior functions executed with the keyboard. This remapping can employ traditional predictive typing techniques so that the zones associated with a most probable next letter are made larger and less likely letter zones are made smaller. This dynamic zone resizing can reduce the error rate when typing on the keyboard.

Spacebar 106 includes a cover 310 having a top surface 306. In one embodiment, cover 310 includes an internally thinner region 308, which, while imperceptible externally, provides display functionality responsive to the actuation of, for example, LEDs within the spacebar 106. LED's by nature have at least two states ON and OFF. By appropriately using these LEDs it is possible to convey information, alerts etc to a user. This type of display may also be useful on conventional keyboards to unobtrusively convey information e.g. from within the spacebar. This display may be used to, for example, show battery life, communications status, caps lock state, or other useful information to a user directly on the spacebar 106. Additionally, all or part of the surface 306 may be provided with underlying capacitive sensors to detect gesture input. Gestures may be recognized by interpreting readings at the different capacitive sensor locations over time and comparing the signature of these readings to a reference in a database residing either in the keyboard or the host. A specific function can be assigned to each signature that is recognized. Such functions can include control modes and settings local to the keyboard, or inputs to the host such as pinch-to-zoom, swipe-to-scroll or other gestures commonly used on today's touch pad computing devices.

Keyboard 100 has a footprint on the surface as deployed equal to the area of the spacebar 106 plus the area of each key array 102,104. The areas of the key arrays 102,104 can be decomposed into two rectangular areas and a triangle where they join together. In one embodiment, the footprint of the deployed keyboard is less than 180 square cm. In one embodiment, the spacebar has a dimension of 110 mm×30 mm, each key array has a rectangular dimension of 94 mm×30 mm and the triangle has a height of 16 mm and a base 30 mm.

Figure 4:
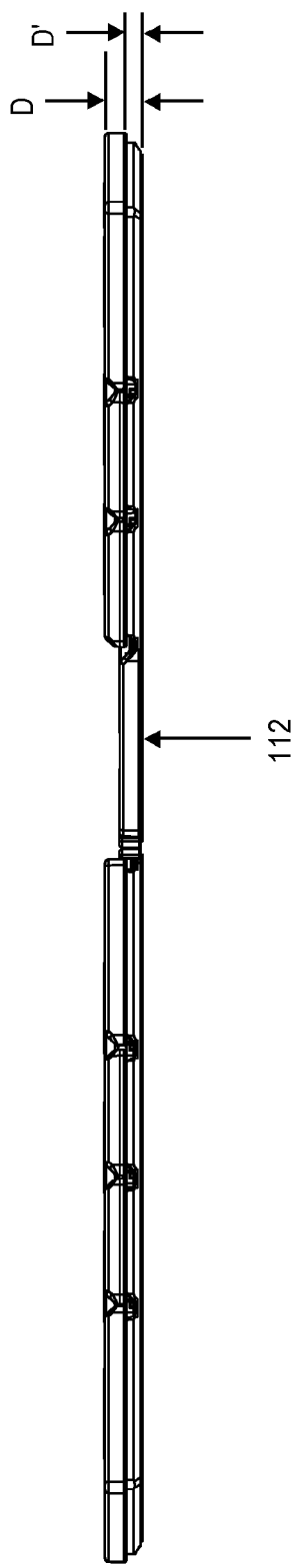
FIG. 4 is a front profile view of a keyboard of one embodiment of the invention with one key depressed.

FIG. 4 is a front view of a keyboard of one embodiment of the invention with one key depressed. Key 112 is shown in a depressed state. In one embodiment, the key arrays have a rest state thickness of D and a depressed state thickness of D'. In one embodiment, D is less than 9 mm. In such an embodiment, D' might be, for example, in the range of 6-8 mm. However, in one embodiment D is approximately 5 mm and D' is approximately 3 mm. In one embodiment, the key travel distance is such that in a fully depressed state the lower edge of the keycap is substantially in contact with the supporting surface. Thus, in one embodiment, the keycap has a height of 3 mm. This results in the minimum possible depressed profile. Typically existing low profile mechanical keyboards have a key travel range of between 1 and 3 mm. Touchpad and membrane keyboards travel less than 0.5 mm. In some embodiments, each mechanical key may travel in the range of 0.5 mm. Various embodiments of the invention are expected to have key travel in the range of 0.5 mm-3 mm. Thus, embodiments of the invention provide full travel keys with a very small form factor. It is expected that in most embodiments all keys in a particular embodiment will have a substantially identical travel distance.

Figure 5:
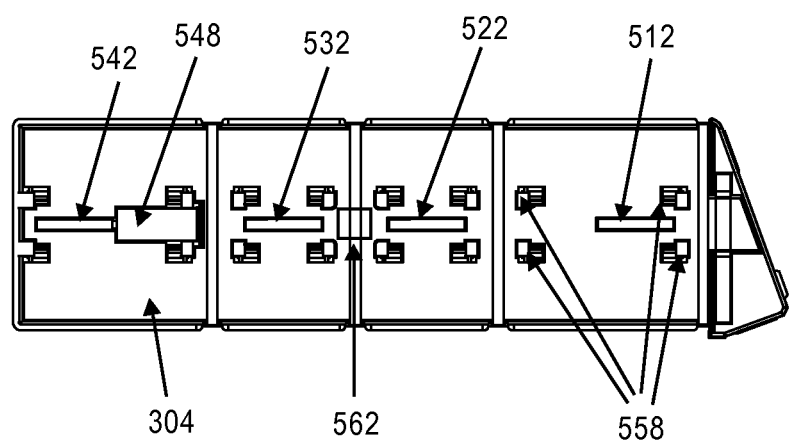
FIG. 5 is a diagram of a key base of one embodiment of the invention.

FIG. 5 is a diagram of a key base of one embodiment of the invention. Key base 304 of the left hand key array is depicted. The right hand key array is a mirror image of what is depicted in FIG. 5. Key base 304 is molded as a single substrate for all four constituent keys of the key array. Molded as part of key base 204 are axle housings 558. Four axle housings 558 are provided for each key location. Additionally, each key location includes a magnet. Key 112 includes magnet 512, key 122 includes magnet 522, key 132 includes magnet 532 and key 142 includes magnet 542. As described below, these magnets maintain the rest state of key, i.e., maintain the key in an up position until sufficient force is applied to overcome the magnetic field of the magnet. Key 142 also includes magnet 548. As described in more detail below, magnet 548 (which has a corresponding magnet in the right hand key array) is used to maintain the keyboard in a collapsed storage orientation. The processor 562 is provided within key base 304 to interpret key press events. In one embodiment, the wall thickness of base 304 is locally thinner or removed to provide a recess into which microprocessor 562 may seat.

Figure 6:
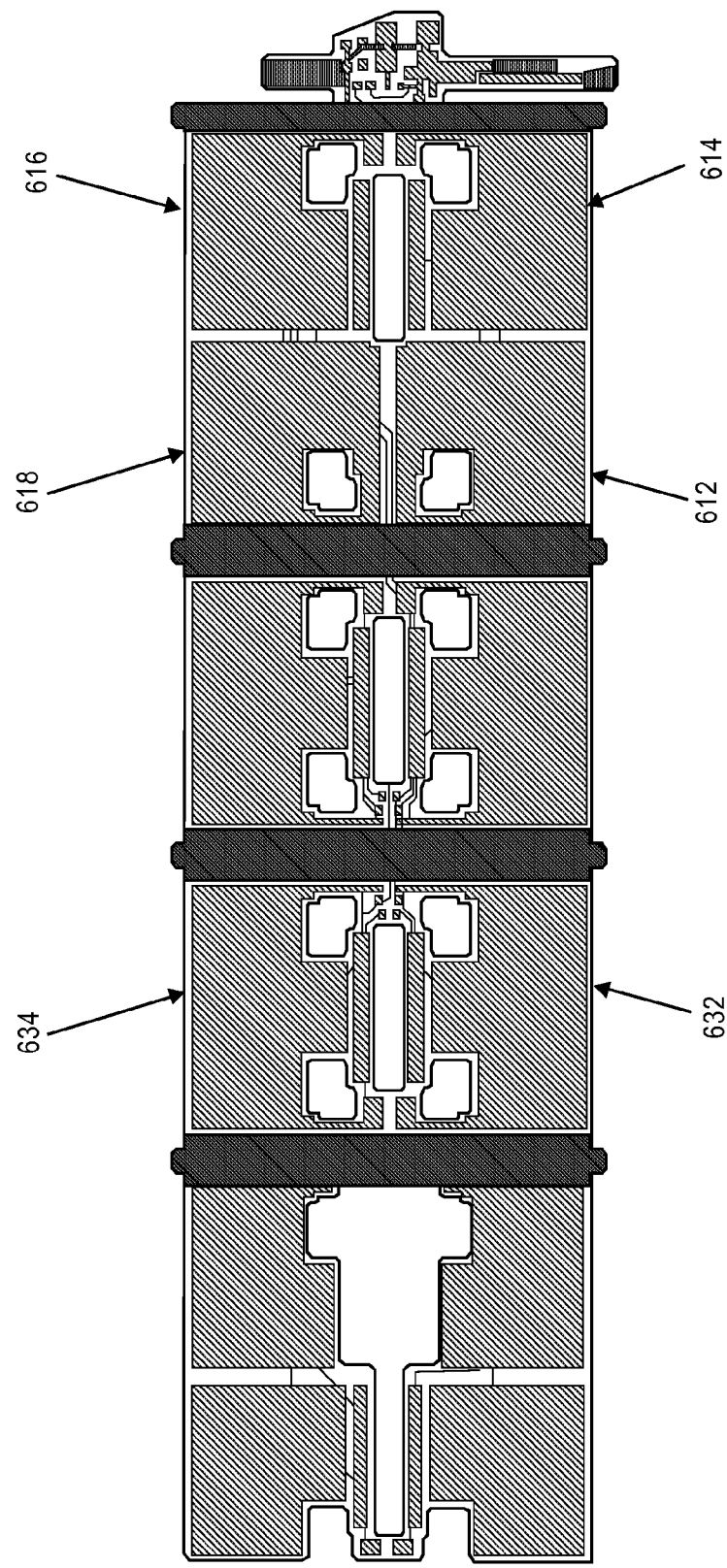
FIG. 6 depicts a flexible circuit board for a key array of one embodiment of the invention.

FIG. 6 depicts a flex circuit for a key array of one embodiment of the invention. FIG. 6 is a flex circuit corresponding to the key array of FIG. 5. Space is provided to accommodate the magnets and axle housings molded into the base. The flex circuit provides multiple capacitive sensors to detect the location of a finger on each keycap, and couples to the processor (562 of FIG. 5). By way of example, four capacitive regions are defined for each large key such as key 112, where regions 612, 614, 616 and 618 correspond to lower left, lower right, upper right and upper left quadrants of the key, respectively. Based on the overlap coverage of the respective capacitive region, when the key is depressed a respective determination of which function of the key that is desired is interpreted by the processor. Although the key 112 in this example has four capacitive sensors, locations between the sensors can be detected through interpolation. Using interpolation, 6 or more discrete locations for the finger can be detected. In the case of the smaller keys such as key 132, in this embodiment only two capacitive regions are provided: capacitive region 632 corresponding to the bottom of the key and capacitive region 634 corresponding to the top of the key. Again, based on the capacitance in the different capacitive regions responsive to depression of the key, and using interpolation, the processor is able to interpret which function is desired and uniquely select that function. The remaining keys have analogous corresponding capacitive regions. Other embodiments of the invention may employ more or differently configured capacitive regions. However, it is desirable that the regions be constituted in a manner that permits identification of unique functions associated with a particular area on the key surface, which areas are touched during a key press event.

Figure 7:
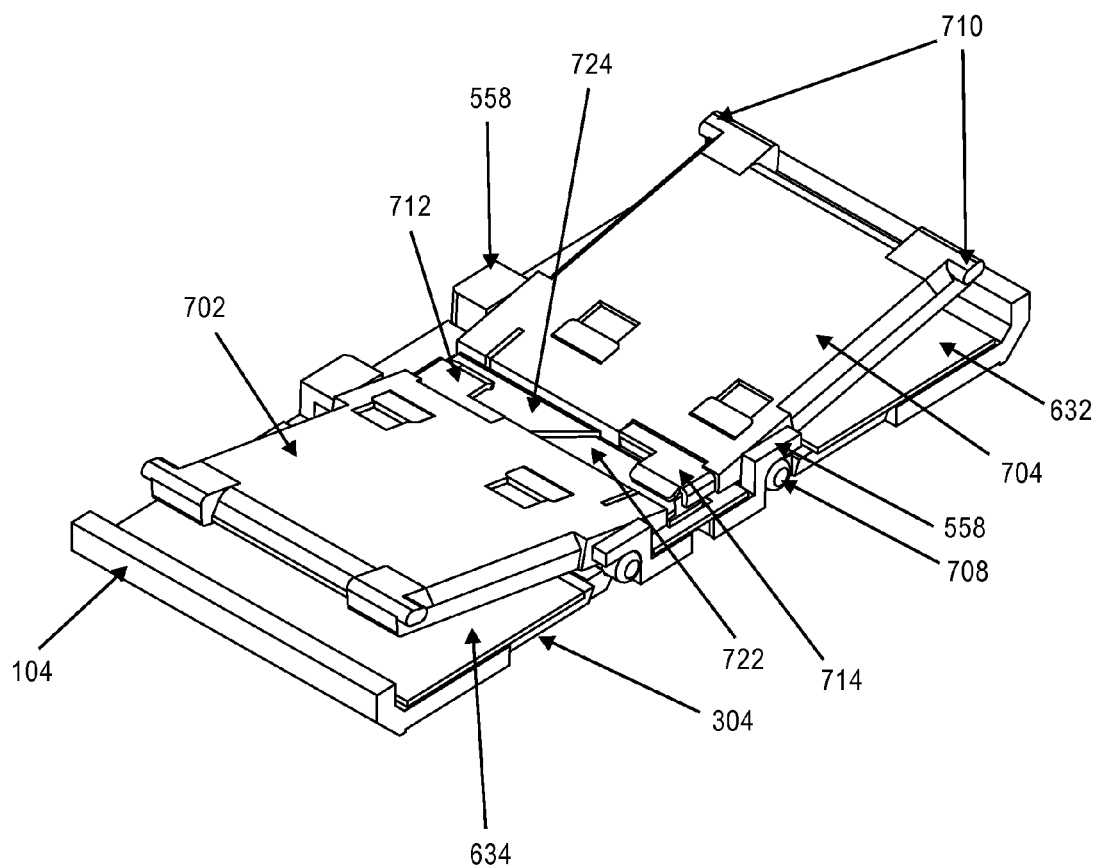
FIG. 7 is a diagram of a key mechanism assembly according to one embodiment of the invention with the keycap removed.

FIG. 7 is a diagram of a key according to one embodiment of the invention with the keycap removed. The capacitive sensing pad 720 may overlay key base 104. The capacitive sensing pad 720 detects when a key is depressed. As the user's finger becomes more proximate to the sensing pad with the depression of the key, a detectable change in capacitance occurs allowing both the fact of depression and the location of the finger during the depression event to be determined. Key base 304 also defines a plurality of axle housings 558 to rotationally engage axles 708 of link members 702 and 704. Link members 702 and 704 engage each other in an interleaved fashion through coupling members 712,722 of link 702 and 714,724 of link 704. In one embodiment, coupling members 722 and 724 are magnetic masses such as steel that can be attracted to an underlying magnet (not shown) disposed in key base 104.

Link members 702,704 may be formed of a combination of steel and plastic using an insert molding process. Generally a high rigidity plastic is selected. One suitable plastic is acetyl resin available under the trademark DELRIN™ from Dupont Corporation. In some embodiments one link member may be somewhat longer than the other. However, it is preferred to keep the link member relatively short such that neither link member exceeds a length of 70% of the maximum cross dimension of the keycap. By maintaining the relative shortness of the link members 202 and 204, flexion is minimized and the parallelism during key depression is improved. In one embodiment, neither link 202 nor link 204 exceeds 50% of the maximum cross dimension of the keycap. In one embodiment, both link member 702 and 704 are identical such that they can be manufactured in a single mold and simply flipped relative to one another for purposes of assembly. Each link member 702 and 704 defines a pair of pegs 710 to engage slots (not shown) in the keycap.

Figure 8A:
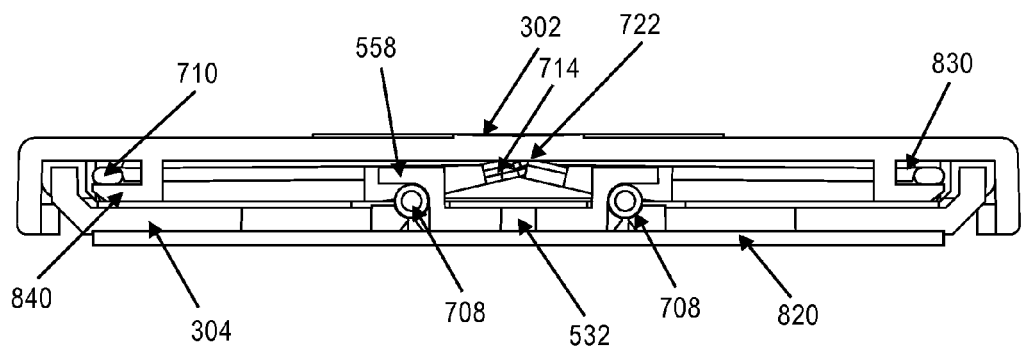
FIG. 8A is a cross-sectional diagram of a key of one embodiment of the invention in a depressed configuration.

FIG. 8A is a cross-sectional diagram of a key of one embodiment of the invention in a depressed configuration. When sufficient pressure is applied to keycap 302, the magnetic masses, in this case coupling numbers 714,722 (and 712,724 not visible in this figure), delaminate from magnet 532 resident in key base 304. In one embodiment, coupling members 712,722 and 714,724 are formed of a ferromagnetic metal such as steel. Steel has high rigidity and durability and is well suited for this application. Other embodiments may have the coupling members made partially or entirely from a non-magnetic material, but use a magnetic mass disposed therein.

A magnet 532 may be selected to be a rare-earth magnet which generates a suitable magnetic field that can continue to exert magnetic force even after delamination of magnetic masses 712,722 and 714,724 from the magnet 532. The feel of pressing the key with this associated magnetic force curve has desirable tactile characteristics. In one embodiment, a suitable magnet generates the magnetic field that requires 35 to 70 grams of finger force to cause delamination. An N52 magnet that measures 10 mm by 1.4 mm×0.9 mm is sufficient to provide such force in the layout shown.

In this sectional view, link axles 708 can be seen residing in axle housing 558. Axles 708 are translationally fixed within axle housing 558 however; they are able to rotate to permit depression/actuation of the keycap 302. To accommodate the movement of the opposing end of the link, peg members 710 reside in slots 830 which permit the pegs to translate away from the center of the key a sufficient distance to permit the key to be fully depressed. In one embodiment, a gripping pad 820 may be applied to the under surface of key base 304 to minimize movement of the keyboard on a supporting surface. For example, in one embodiment, gripping pad 820 may be an elastomeric material with favorable frictional characteristics on common surfaces such as wood, metal, and plastic. In one embodiment, the pad is made from silicone rubber. Gripping pad 820 may be adhered with a suitable adhesive to the key base 304. In one embodiment several discrete gripping pads are applied instead of a single pad substantially coextensive with a lower surface of the base member 304.

Figure 8B:
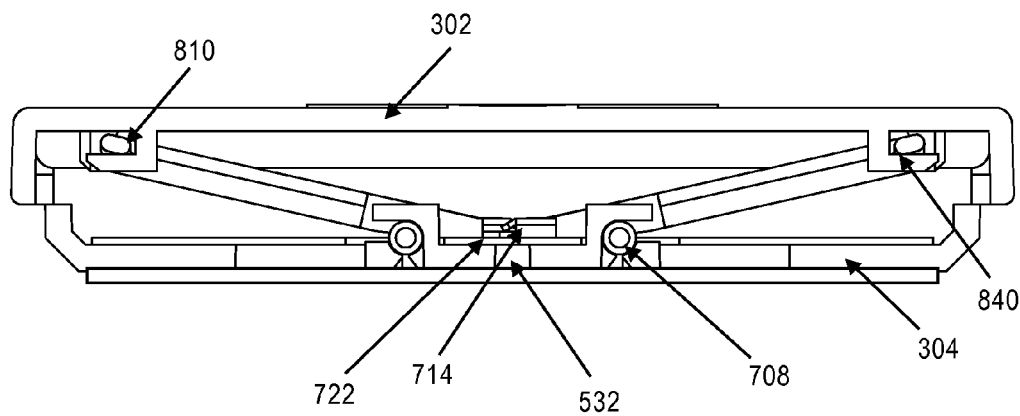
FIG. 8B is a sectional diagram of the key of FIG. 8A in a rest state orientation.

FIG. 8B is a sectional diagram of the key of FIG. 8A in a rest state orientation. By referring to this orientation as a "rest state orientation," Applicant intends to indicate that this is the state the key will adopt absent the application of an external force. This may also be thought of as the "up" configuration. In this configuration, magnet 532 is sufficiently close to magnetic masses 722 and 724 to be functionally laminated thereto. The back end of slots 830 in keycap 302 limit the travel of pegs 710 when the key rises, and when magnetic masses 722 and 724 strike magnet 532, the two limits work in conjunction to prevent the key from rising above the prescribed level in the rest state. Ledges 840 are molded into keycap 302 to retain pegs 710 in order to fasten the keycaps to the base.

Figure 9:
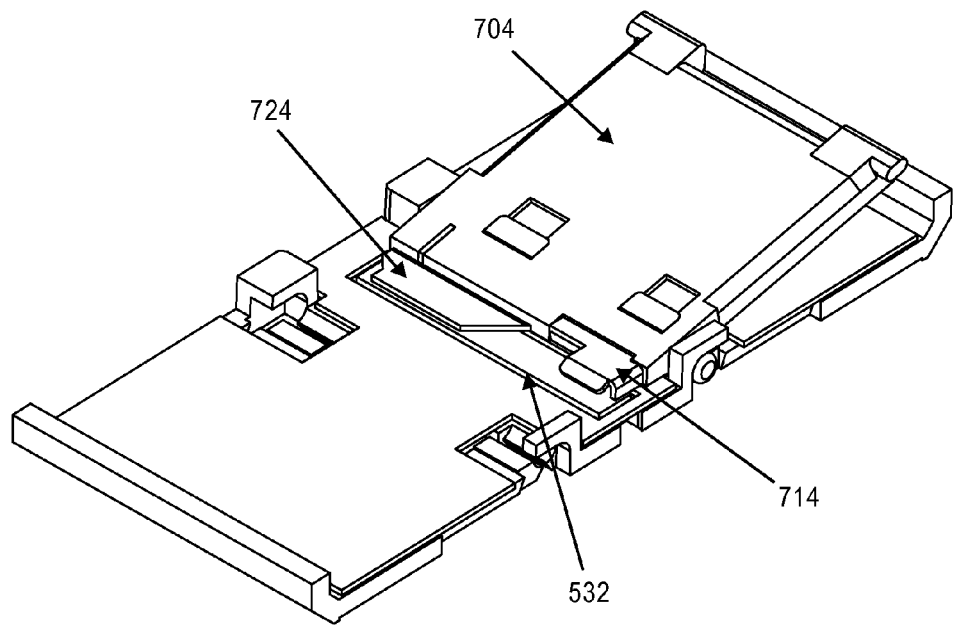
FIG. 9 is a cutaway view showing a single link of one embodiment in the invention.

FIG. 9 is a cutaway view showing a single link of one embodiment in the invention. Links 702 and 704 are mechanically connected by metal members 712, 722, 714 and 724 (all visible in FIG. 7), which collectively comprise the "Coupling Members". The mechanical connection of these coupling members is formed by the interleaving of upper member 712 and lower member 724, as well as the counterpart upper member 714 and lower member 722. Magnet 532 is shown beneath the coupling members. Link 702 (not shown in this Figure) would have mirror images of lower interleaved member 714 and upper interleaved member 724 (e.g. member 712 and 722) such that the lower interleaved member 722 for link 702 (not shown in this Figure) would overlay the magnet 532. Member 722 is also adjacent to lower interleaved member 724 and beneath upper interleaved member 712. Similarly, the upper interleaved member 712 for link 702, when installed is disposed above and in engagement with lower interleaved member 724. Thus, in rest state, 722 and 724 (not shown) are substantially flush with and laminated via magnetic attractive force to magnet 532.

Figure 10:
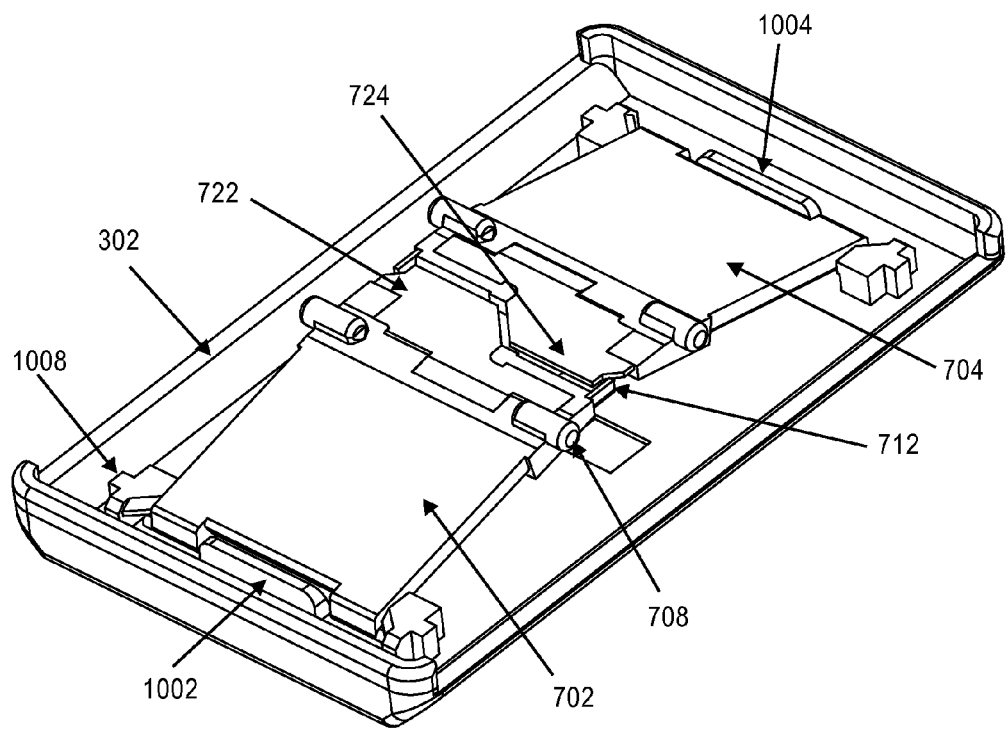
FIG. 10 is a bottom view of a key of one embodiment of the invention with the key base removed.
Figure 11:
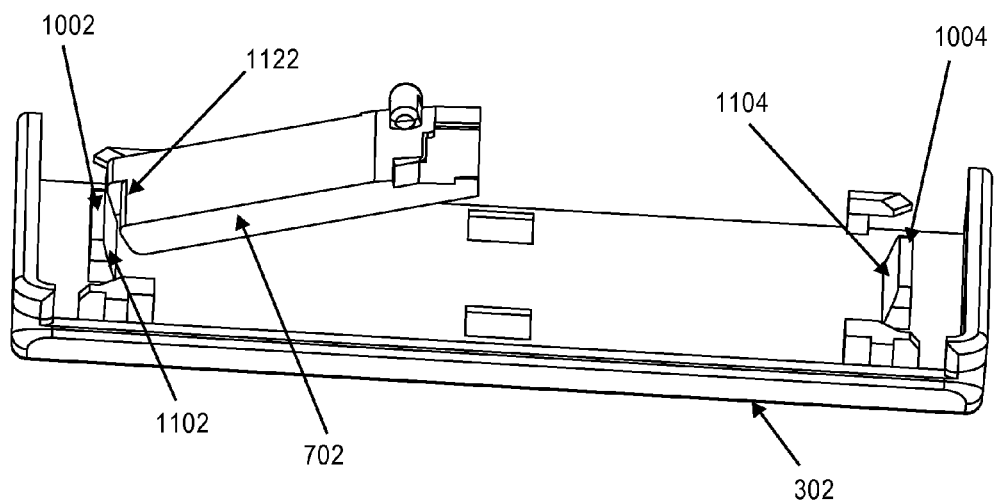
FIG. 11 is a sectional view of a bottom view of selected parts of a key for one embodiment of the invention with the key base removed.

FIG. 10 is a bottom view of a key of one embodiment of the invention with the key base removed. In this view can be seen links 702 and 704 and their respective lower interleaved members 722 and 724. Upper interleaved member 714 of link 704 resides in engagement with lower interleaved member 722. Link axles 708 are also visible FIG. 11 is a sectional view of FIG. 10 with one link removed. In this view, the sloped surface 1104 of hard stop 1004 is clearly visible. The hard stops 1002 and 1004 may be molded as part of keycap 302. The link-facing surface 1102 is sloped such that when the key is depressed it is in contact with link member 702's sloped surface 1122. Link member 704 (shown in FIG. 10) has a mirror image contact with a sloped surface on hard stop 1004. These two contact points serve to prevent translation of the keycap when it is at the bottom of its travel during an actuation. The risk of keycap dislodgement resulting from an offset force on the keycap is also reduced.

Referring again to FIG. 7, link members 702, 704 are maintained in the rest state position by the magnetic field of the magnet underlying interleaved coupling members 712, 722, 714 and 724 which mutually engage in an interleaved fashion as previously described. Capacitive sensing pads 634 and 632 cover substantially the entire base of the key outside the magnetic region. Pegs 710 are intricately molded as part of respective link members and engages slots in the keycap when the keycap is installed. The described structure permits highly parallel key travel which minimizes tilt of the keycap regardless of where the depression force is applied. The capacitive pads 720 and 632 eliminate the need for a rubber dome spring which in the common configuration of key switches generally leads to a less crisp, and inferior tactile sensation. Both the capacitive pad and magnetic force source are wear-free and have essentially infinite life. Additionally, the capacitive pads 720 and 632 provide determination of a key press as well as the location of a finger on the keycap when the key is pressed. Interpolation of the capacitance values detected on the two pads 720 and 632 can determine a range of locations for the finger between the pads that is far more than merely the two pad centers. This effectively allows for one key to provide multiple functions. In this embodiment, other keys may have a set of 4 pads in each quadrant of the key, allowing for even finer determination of the finger location. Other embodiments may extend this to greater than 4 pads per key.

Figure 12:
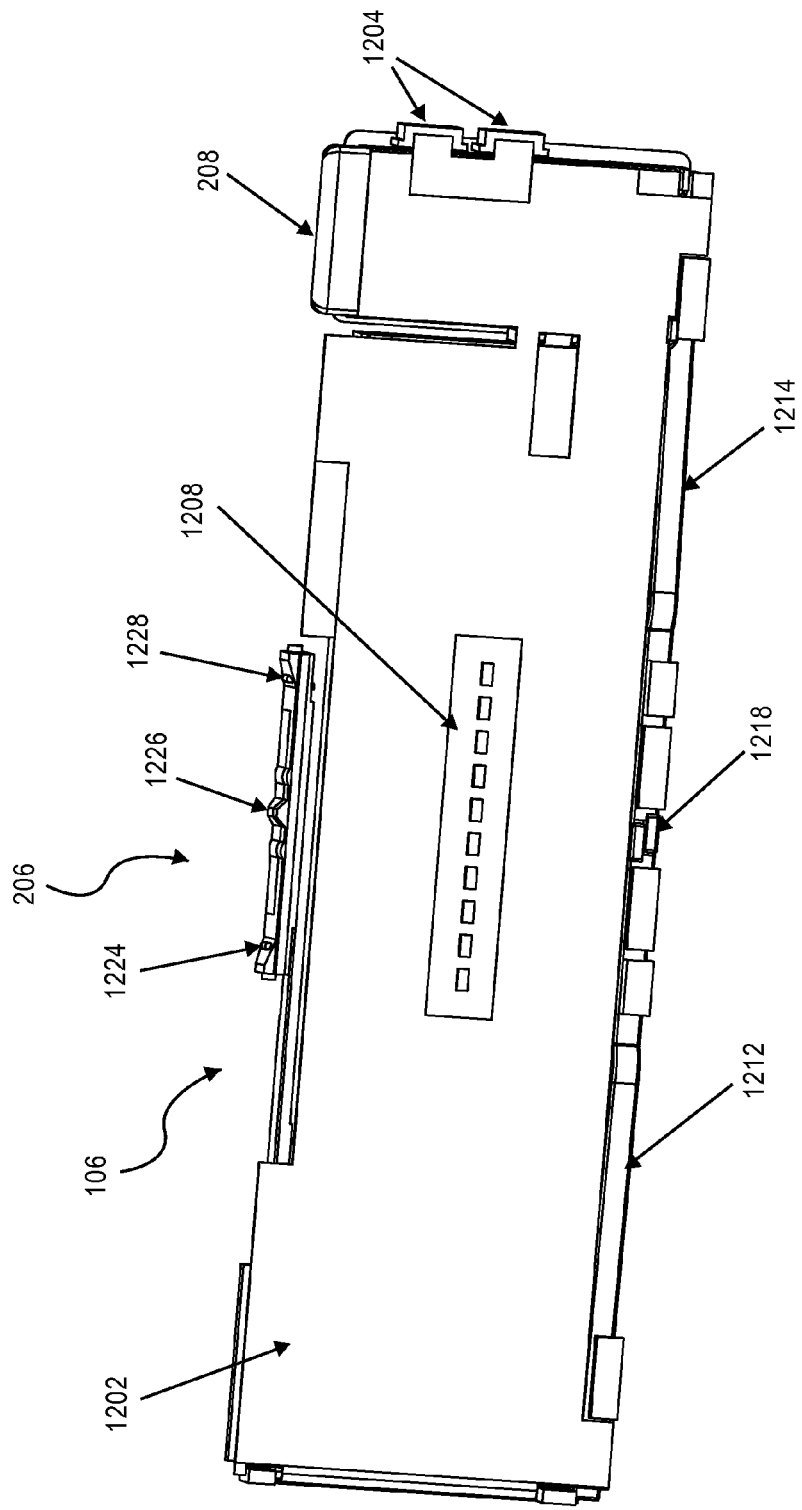
FIG. 12 is a diagram of the spacebar with the cover removed.

FIG. 12 is a diagram of the spacebar with the cover removed. Spacebar 106 includes a flex circuit 1202, which may include an array of LEDs 1208 which can provide the display functionality mentioned in connection with FIG. 3 above. Additionally, flex circuit 1202 can provide capacitive sensing for gesture detection. The placement of the flex circuit in the spacebar immediately below the cover permits gesture sensing on the surface of the spacebar, as the capacitive detection occurs without depression of the spacebar. Hex circuit 1202 also couples to terminals 1204 which permit charging of battery contained within the spacebar 106. The links 1212 and 1214 are levers that interleave to form a mechanical interconnection 1218. Links 1212 and 1214 each laminate to a magnet to provide a force to retain the spacebar in the up position. As described in more detail below with reference to FIGS. 15A-C, pressure on the spacebar causes delamination of the levers from their magnets, which then relaminate when pressure is relieved. Also visible in this view is the topology of magnetic mass 206. To mechanically interconnect the elements by magnetic force, a single magnetic mass is sufficient. This mass provides a magnetic force to mechanically join the spacebar 106 to the key arrays 102 and 104. Because the interconnection is also used to electrically pass power, ground and data between the key arrays and the spacebar 106, the magnetic mass is divided into submasses that form discrete electrical contacts. 1226 is the center magnetic mass which provides a ground connection. 1228 and 1224 are both connected to power and are separated from the 1226 ground mass by an insulator. The assembly of the three submasses forms the complete magnetic mass 206. Mass 1224 couples to magnet 202 (shown in FIG. 2), mass 1226 couples to both magnets 212 and 214 and mass 1228 couples to magnet 204. The topology of magnetic mass 1226, having a raised center and a two flanking bumps along an otherwise flat surface where magnets 212 and 214 connect, has been found to ensure strong magnetic connections while concentrating the mechanical force on a localized electrical contact point (i.e. the bumps). This is important to ensure that the power and data paths remain well coupled during use.

Figure 13:
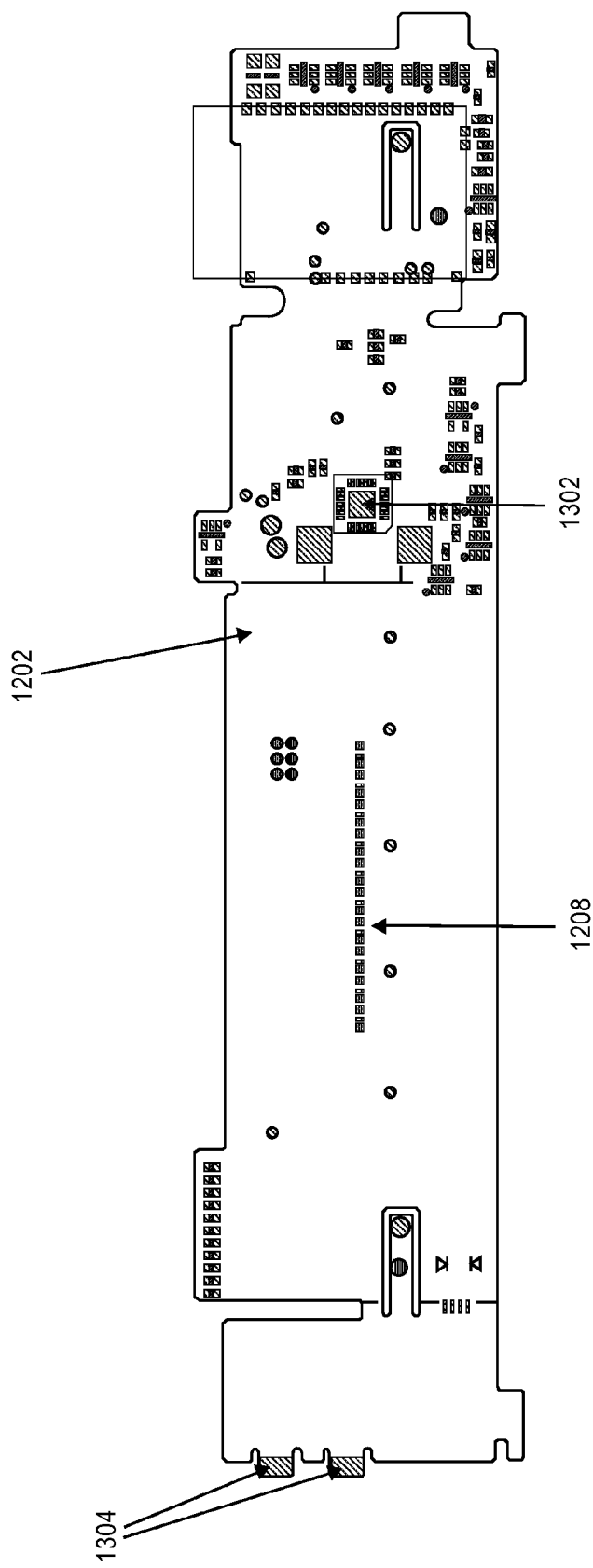
FIG. 13 shows a flex circuit for a spacebar of one embodiment of the invention.

FIG. 13 shows a flex circuit for a spacebar of one embodiment of the invention. The flex circuit includes terminals 1304 which are coupled to the charging terminals of the spacebar. The LEDs 1208 are also shown on the flex circuit. A microprocessor 1302 is coupled to the flex circuit and is used to interpret keyboard events. Keyboard events include, but are not limited to, key press events, gesture events, spacebar events and the like. The microprocessor also controls the wireless signaling module such as a Bluetooth™ module to transmit keyboard events to a host. Additionally, microprocessor 1302 may, in its onboard memory, store user-specific data such as passwords, unlocking codes and the like. Microprocessor 1302 can then be used, for example, to unlock a smartphone from a stored password without the need for manually entering the code. This has the advantage that unlock codes (commonly four digits for most smartphones) can be made much longer and more robust, thereby improving the security of the phone. In other embodiments, a separate memory may be provided to store such user specific data.

Figure 14:
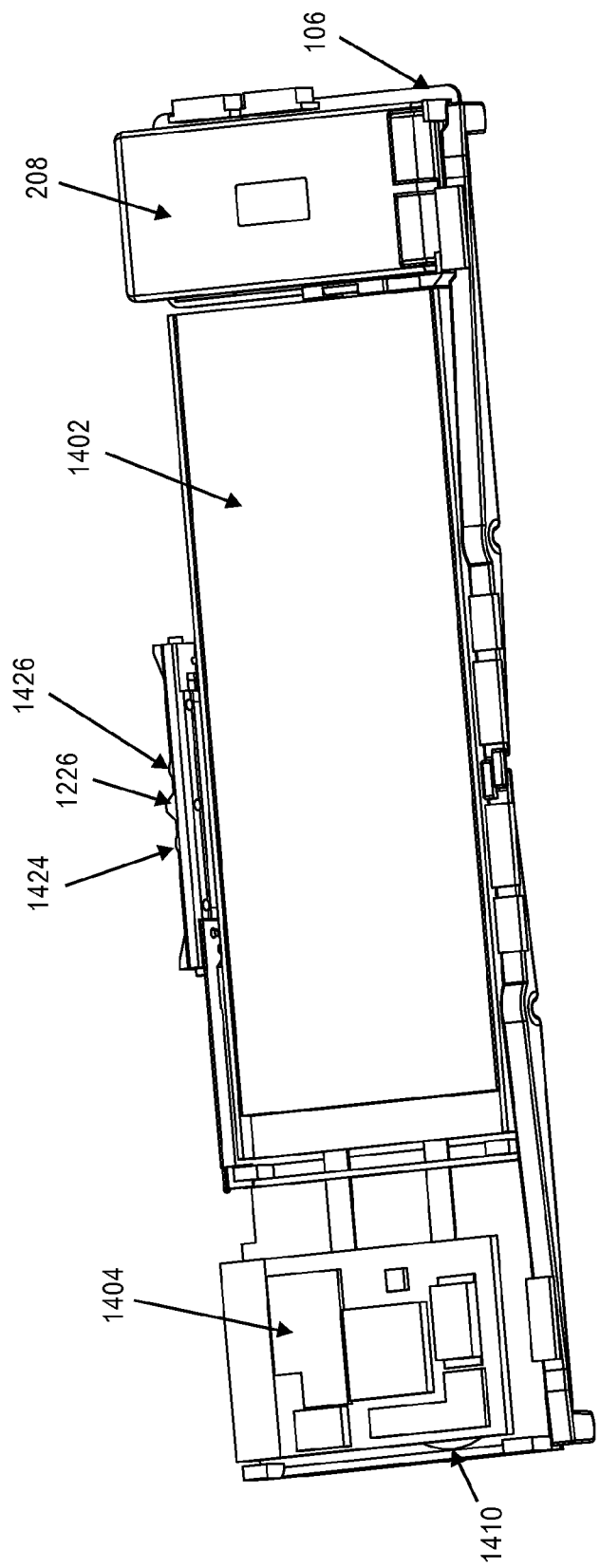
FIG. 14 is a further view of the spacebar with the cover and flex circuit removed.

FIG. 14 is a further view of the spacebar with the cover and flex circuit removed. Battery 1402, which is used to power the spacebar and key arrays in one embodiment of the invention, occupies the majority of the space within the spacebar. Also within the spacebar is defined a storage space for the charging beam 208. At the opposite end is disposed the wireless communications module 1404, which in one embodiment may be a Bluetooth™ module. A wireless communication module 1404 may be a commercially available Bluetooth™ module such as a BCM920730MD_Q40 available from Broadcom™ Underlying the wireless signaling module 1404 can be seen a piezoelectric speaker 1410, which functions both as a speaker to provide audio output of the device and also provides a pressure sensing function. A second speaker is disposed at the other end of the spacebar below the charging beam. With this balanced arrangement, these two pressure sensors 1410 work in concert as a scale to measure the intensity of pressure applied to the spacebar 106. The piezo sensors are also responsive to overall acceleration of the spacebar. Thus, in one embodiment, they are used to determine whether a spacebar input event has occurred. As described below, an event detected by the pressure sensors may also be used to stimulate an automatic login procedure or other arbitrary automatic script between a host or recipient device.

In one embodiment, the battery is a lithium polymer rechargeable battery having a cell potential of 3.7V, and a capacity of 350 mAh. It is anticipated that with normal use this battery will allow one embodiment of the invention about 70 hours of actual operation before requiring a recharge. A wireless signaling module 404 may be a commercially available Bluetooth™ module such as BCM920730MD, available from Broadcom™. In this side view, it is possible to clearly see the bumps 1424 and 1426 of magnetic mass 1226. By concentrating the force of the magnetic attraction into a small area of high mechanical pressure, these bumps help ensure a reliable electrical connection between the permanent magnets of the key array and the magnetic masses of the spacebar.

Figure 15A:
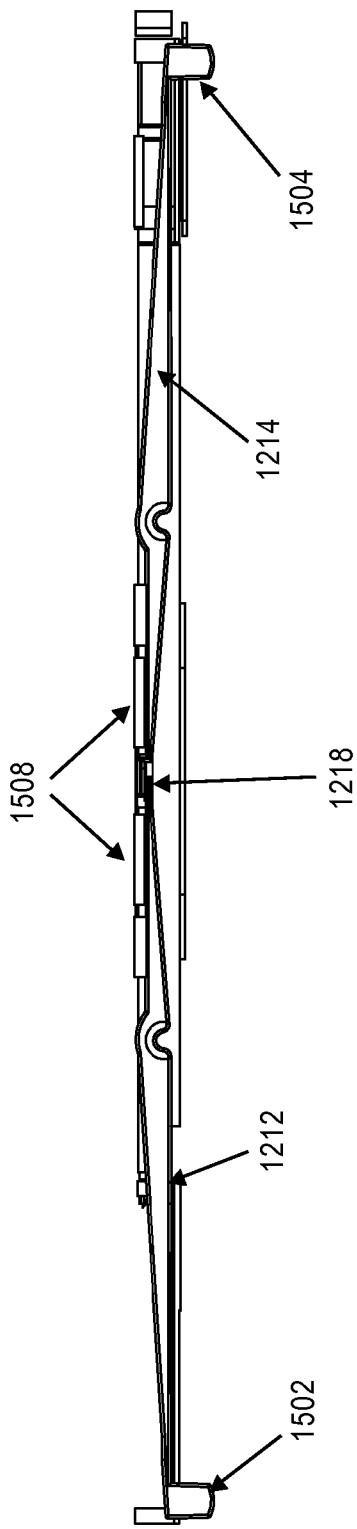
FIGS. 15A and 15B are diagrams of the link mechanism in an up and down orientation, respectively.
Figure 15B:
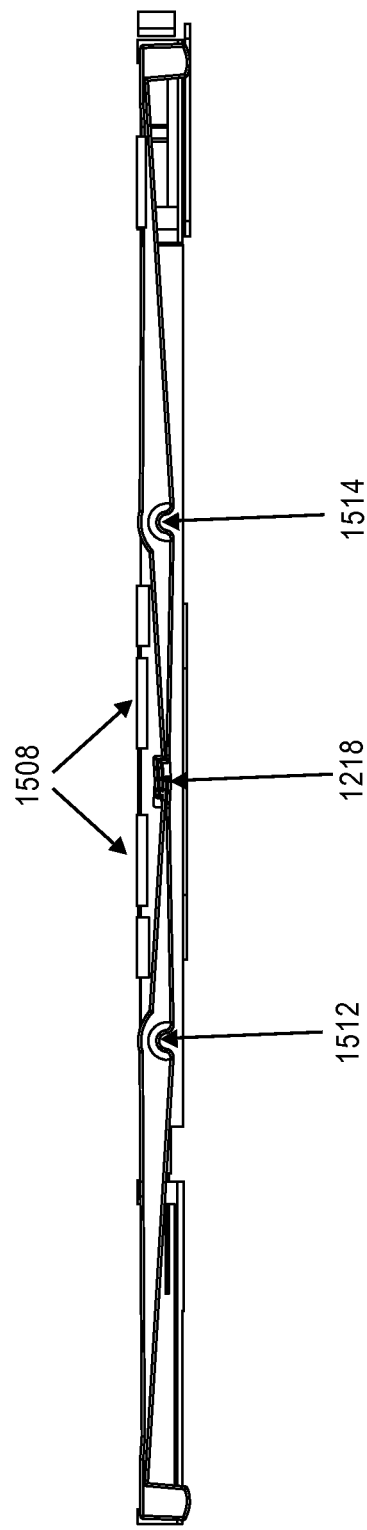

FIGS. 15A and 15B are diagrams of the link mechanism in an up and down orientation, respectively. Feet 1502 and 1504 support the spacebar elevated above the table. Opposing ends of levers 1212 and 1214 are mechanically linked at interconnection 1218, which in one embodiment corresponds to four coupling members comprising two pairs of upper and lower fingers. Levers 1212 and 1214 laminate to magnets 1508, which bias the spacebar into an up position. When sufficient pressure is applied to the spacebar, the feet 1502 and 1504 retract into the spacebar as respective levers 1212 and 1214 rotate about axles 1512 and 1514, causing them to delaminate from magnets 1508. A spacebar depression event may be detected by a capacitive sensor or electrical contact on flex circuit 1202 or, for example, by detection of a pressure or acceleration event at the pressure sensors (discussed above). The processor, as a result of the detection of the spacebar event, transmits the spacebar depression event to the recipient device.

Figure 15C:
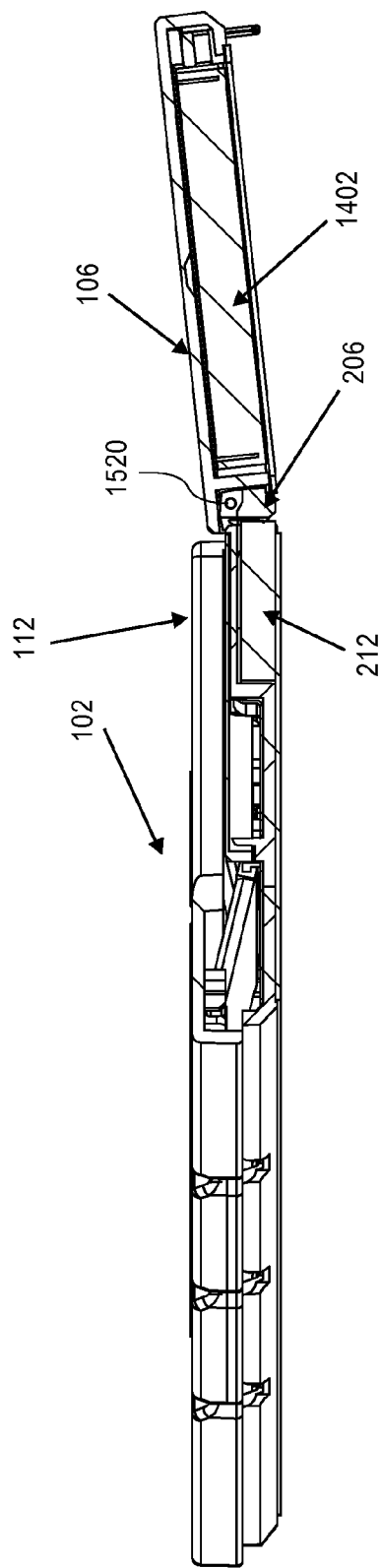
FIG. 15C is a sectional view of the interconnection between the spacebar and the key arrays.

FIG. 15C is a sectional view of the interconnection between the spacebar and the key arrays. Magnetic mass 206 couples to magnet 212 of key array 102. The magnetic mass is contained in a structure attached to axle 1520 but remains static relative to relative to magnet 212. The remainder of spacebar 106 rotates about axle 1520 in response to a spacebar depression event. Because the contact bumps remain in strong static mechanical contact during the motion of the spacebar, this ensures that the electrical connection is not broken. Further, this eliminates wiping wear on the contact surfaces even during repetitive cycling of the spacebar from depression events. Thus, the spacebar 106 rotates about the axle 1520 during depression rather than translating. While one embodiment of the invention may avoid this axle mechanism and fix the magnetic mass directly to spacebar 106, due to the high number of expected usage cycles for the spacebar and the desirability of maintaining a reliable mechanical and electrical connection with the key arrays, it is preferred to avoid moving the magnetic mass relative to its permanent magnet counterparts A further benefit of this axle pivot arrangement is that it allows the adjacent edge of the spacebar to always reside at the lower depressed state position, while the far edge swings up and down about 2 mm for actuation. This permits the edge of spacebar 106 to stay below the nearby keycap 112, eliminating collision with a user's finger during actuation of the key.

FIG. 16 is a perspective view of the spacebar with the beam 208 partially removed. Beam 208 resides in the spacebar 106 in a stowage location sized for a snug fit such that the beam will not fall out of its storage slot without an impulse force from a user. By applying an impulse force, a user can cause the beam to partially eject from the slot. A magnet disposed within the slot interacts with a magnetic strip 1608 such that the beam will not eject free of the spacebar housing in response to a normal impulse force. End 1610 of beam 208 may be shaped to insert into a USB, mini-USB, or other port connector capable of transmitting power to a connected device. This permits beam 208 to be connected to a host to provide a charging path to the opposite end of beam 208. Also visible in this view are charging terminals 1604 and 1606 of the spacebar. In one embodiment, charging terminals 1604 and 1606 are constituted as permanent magnets.

Figure 17:
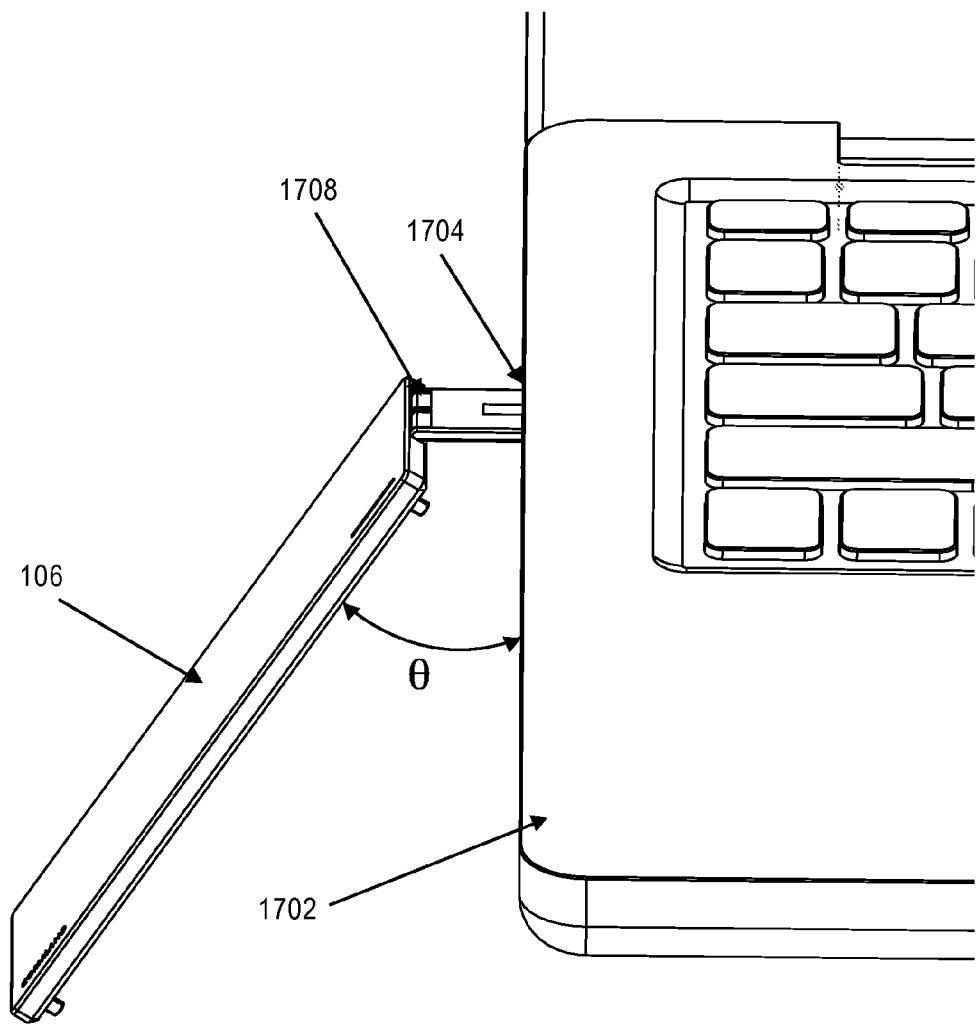
FIG. 17 is a view of the beam coupled to a host and spacebar.

FIG. 17 is a view of the beam coupled to a host and spacebar. The host 1702 provides a port 1704 (such as a USB port, Thunderbolt port, 1394 port or other port through which power may be passed to a peripheral device) compatible with the shape and contacts integrated into the end of beam 208. The rigid beam 208 eliminates the need for any flexible charging cable and is less than three inches in length. In one embodiment it is 26.7 mm long and 12.4 mm wide. Magnetic masses 1708 disposed at the opposing end of beam 208 interconnect with the magnetic terminals of spacebar 106. Spacebar has only two connecting pins, and internally adjusts the electrical polarity associated with each pin so that the beam can be attached in an arbitrary orientation.

Additionally, because the angle and orientation of the magnetic interconnection is variable, it permits the spacebar to be coupled to the host in a range of angles θ without breaking the interconnection. θ can vary by more than 180 degrees to work around nearby obstructions from a tabletop, neighboring connectors, and the host housing. Notably, the connection can also breakaway in response to an applied force intentional or unintentional without damaging the beam or device. This allows the device to be charged in space-constrained environments. Additionally, the magnetic interconnection is sufficiently strong to sustain the weight of the spacebar 106 and maintain electrical connection to the host even when otherwise unsupported. While the host 1702 in this instance is shown as a laptop computer, the host could be a desktop computer or need not be a computer at all; for example, the host, for charging purposes, may be a powered USB hub, or an AC wall adapter.

Figure 18:
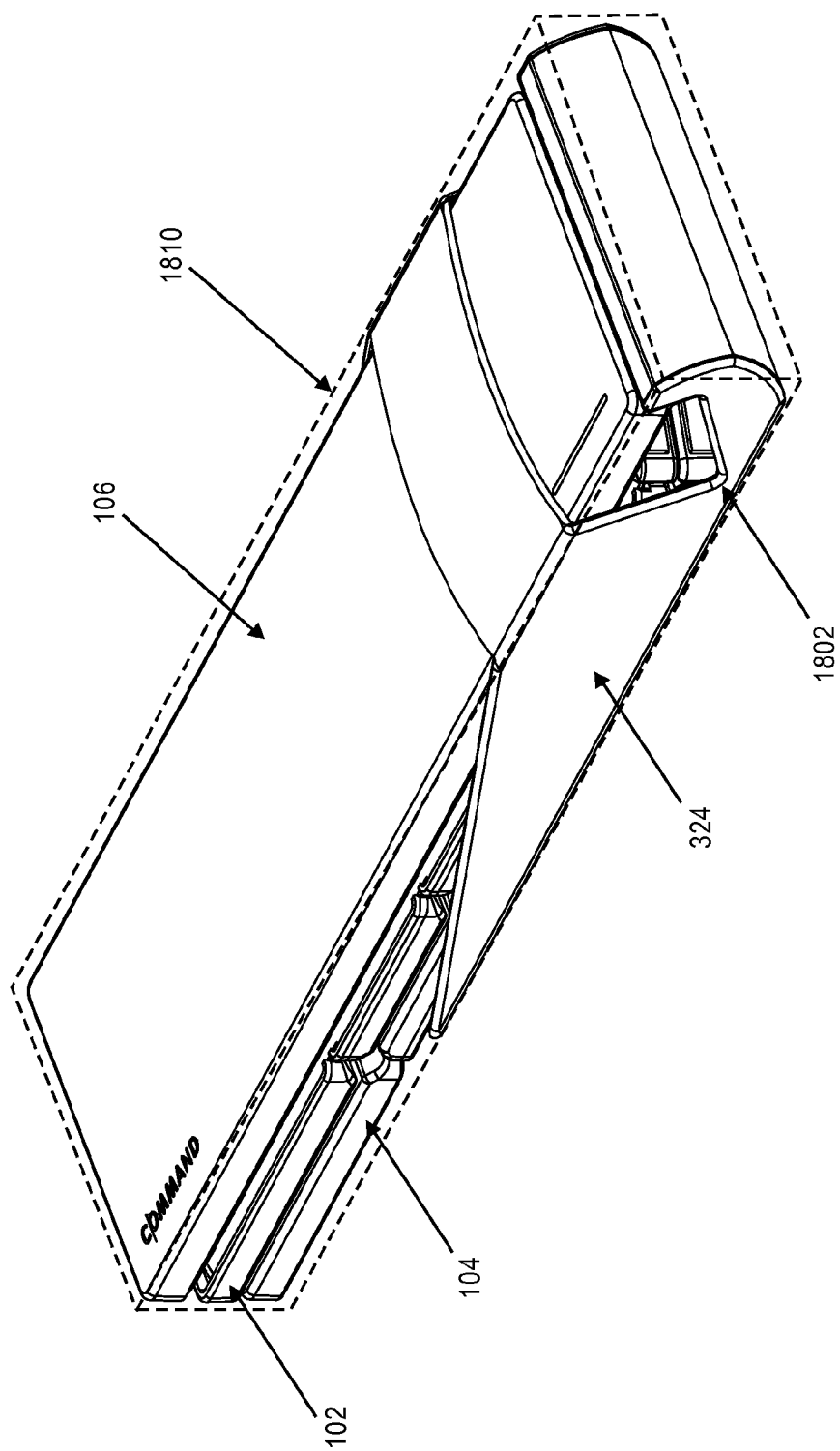
FIG. 18 is a perspective view of one embodiment of the invention in a stowed orientation.

FIG. 18 is a perspective view of one embodiment of the invention in a stowed orientation. As shown in this view, clip 324 retains the spacebar 106 and two key arrays 102 and 104 in a parallel stack. Also visible in this view is a jaw 1802 of clip 324, which allows a recipient device to be held at a desirable angle for viewing. The recipient device may be a host such as a smartphone or tablet computer. When inserted into the clip 324, the key arrays 102 and 104 have their keys depressed, thereby reducing the volume of the stack. Because the clip only covers one end, the far end keys have a tendency to expand as they seek the rest state (up orientation). However, as alluded to above with reference to FIG. 5, an additional magnet 548 attracts to its counterpart magnet in the other array to collapse the keys and hold them in a depressed state during stowage. In one embodiment, even absent the clip 324, the two key arrays and the spacebar can collapse and retain themselves in a compact bundle under the force of the integral magnets. Magnets 212 and 214 also attract the other ends of the two key arrays 102 and 104, and retain them together sufficiently to compress their keys to their depressed and most compact state. Moreover magnets 212, 214, and 548 all can attract magnetic material in the spacebar, such as a 430 alloy stainless steel backplate. In this manner, a three layer stack of two key arrays and the spacebar are effectively magnetically self-propelled into proper alignment, such that the keyboard collapses itself into a single self-retaining portable bundle that occupies a minimum volume. It is believed that this "packageless" magnetic packing is useful for other electronic devices with dissociable elements where the individual elements require a different spatial arrangement during use as compared with their compact storage arrangement. This volume is equal to the depressed dimension of the two key arrays plus the spacebar thickness. In one embodiment, the spacebar with the two depressed key arrays has a thickness of about 10 mm. In one embodiment, while strictly speaking, the clip 324 is not necessary to hold the dissociable parts together for transport, it provides a protective cap for the magnetically coupled dissociable elements and a smooth surface to ease entry into a pocket and also provides a stand for a recipient device. In one embodiment the additional volume associated with the clip may be less than 10% of the total collapsed volume of the device. In one embodiment, the additional volume of the clip is between 1 and 3%.

Generally, the keyboard is the shape of a narrow candy bar when stowed. In one embodiment, the collapsed volume of the keyboard plus clip is less than a bounding volume 1810 of about 35 cubic centimeters. Other embodiments may be in the range of 25 to 180 cubic centimeters. It is preferred that the collapsed volume be less than 80 cubic centimeters. As reflected in the drawing, bounding volume as used here is intended to refer to the volume of a minimum rectangular solid that can enclose a device. Thus, the bounding volume does not omit interstitial spaces interior between elements of the device as would be the case under a strict Archimedes principle analysis.

When disassembled the keyboard then enters a low-power idle state to conserve battery life. Some functionality may still be maintained even in this state. For example, some embodiments provide an automatic login function and a device range alert as discussed more fully with reference to FIG. 20 below. These functions, as well as for example, a battery status check responsive to a user request (such as a pressure sensor event) may be maintained by the processor while it is substantially asleep. In one embodiment, a pressure event registered by the piezoelectric speaker 1410 will cause microprocessor 1302 to calculate the remaining charge in the battery and generate a bar graph in response appearing on the array of LEDs 1208.

Figure 19:
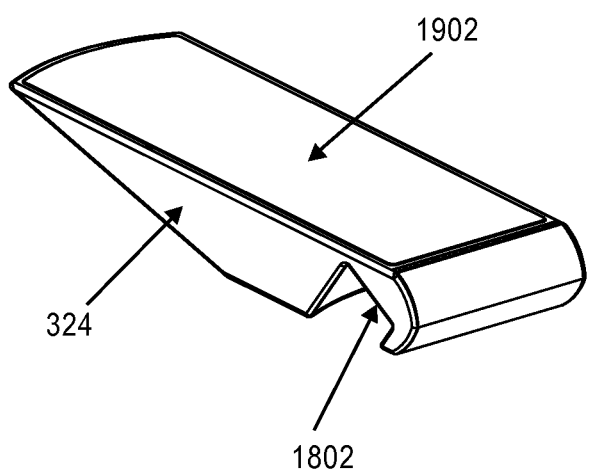
FIG. 19 is a perspective view of the bottom side of the clip.

FIG. 19 is a perspective view of the bottom side of the clip. Clip 324 includes an elastomeric or otherwise nonslip pad 1902 on a lower surface thereof to prevent slippage when a recipient device is installed in jaw 1802. In one embodiment, clip 324 is injection-molded from thermoplastic and the nonslip pad is silicone rubber applied with an adhesive backing.

Figure 20:
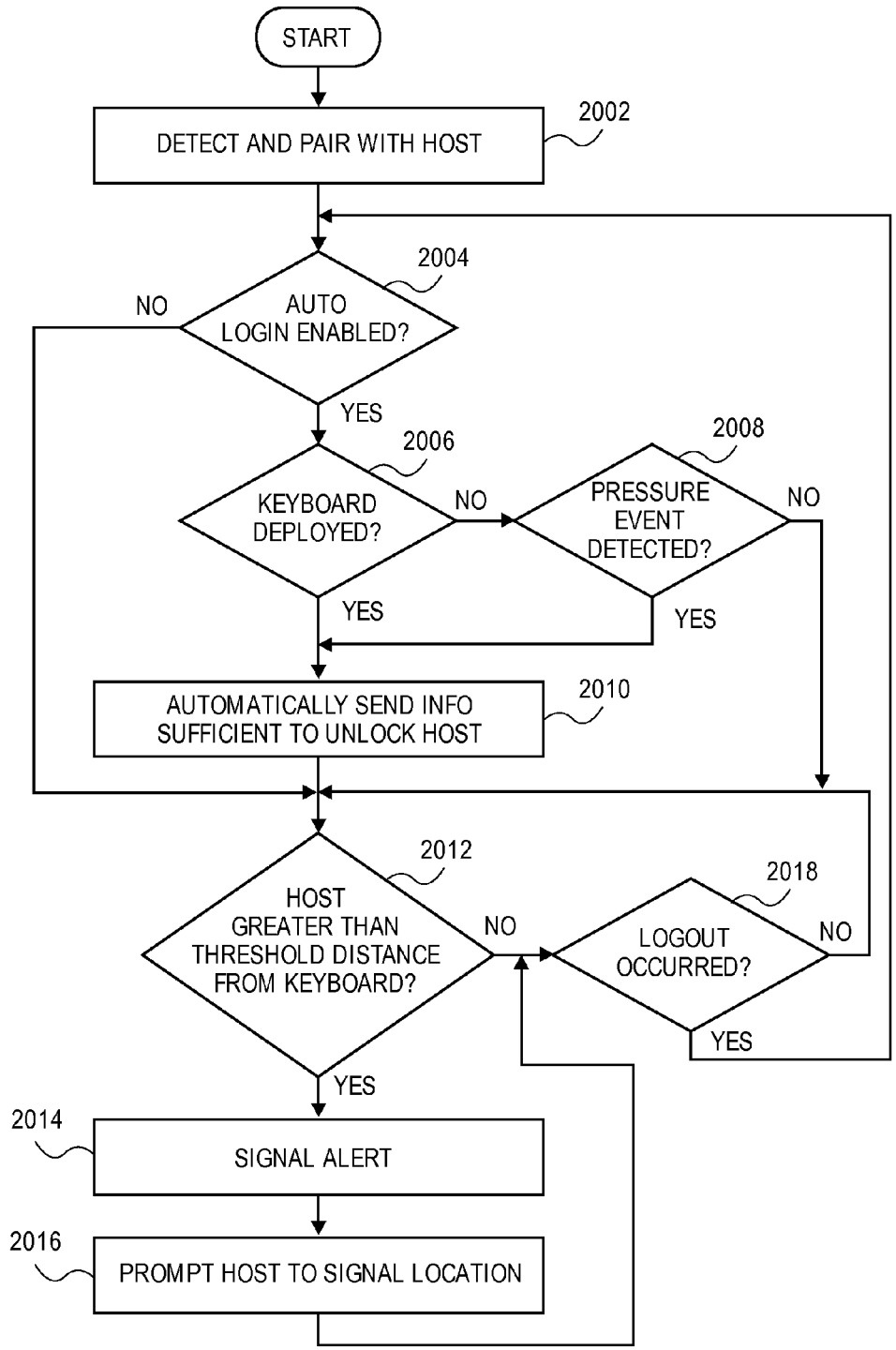
FIG. 20 is a flow diagram of the operation of one feature of one embodiment of the invention.

FIG. 20 is a flow diagram of the operation of one feature of one embodiment of the invention. At block 2002, the keyboard detects and pairs with a host/recipient. By way of example, the keyboard may pair via Bluetooth™ with a smartphone or tablet computer when the keyboard comes within range of such device. At decision block 2004, the keyboard determines whether automatic login is enabled for the device. If automatic login is enabled for the device, a determination is made whether the keyboard is in a deployed configuration at decision block 2006. By way of example, the spacebar knows whether the key arrays are connected or not connected to it at any given time. If the keyboard detects a pressure event or if the keyboard is deployed, it may automatically send sufficient information to unlock the host at block 2010. Other arbitrary events may be used to trigger the automatic login procedure when the host is within range of the keyboard.

Thereafter, a determination is made whether the host is greater than a threshold distance from the keyboard at decision block 2012. As long as the host is not at a distance greater than the threshold from the keyboard, a further determination is made whether a logout has occurred at block 2018. If the logout has occurred at decision block 2018, the process returns to determine whether or not automatic login is enabled. However, if no logout has occurred, the process continues with a further determination of whether the host is at a distance greater than the threshold at block 2012. Assuming that the host has traversed a distance greater than the threshold from the keyboard, at block 2014, the keyboard signals an alert. This may take the form of an audible alert, a visual alert such as flashing of the LEDs or both. It is also possible that the alert may vary depending on whether the keyboard is deployed or not. For example, if the keyboard is deployed, the alert may be visible with the LEDs flashing. Alternatively, if the keyboard is stored, the alert could be audible under the presumption that a user would not see a visible alert in that configuration.

Additionally, at block 2016 the keyboard prompts the host to signal its location. This may be prompting the host to emit an audible tone, a visual signal, vibrate, etc. In this manner, risk of loss or theft of a host device is reduced. In another embodiment, regardless of the distance between the host and keyboard, at least one element of the keyboard is used to send a signal to the host which causes the host to emit a sound or vibration or other alert. This function may be configured to operate whether or not the host has its alert speaker or vibrator enabled. This can be achieved for example by accessing the music playing controls of the host smartphone even while the smartphone is in a sleep state, and causing the volume to be maximized and a song to be played as the alert. Use of this function allows a user to locate a nearby smartphone, for example, that is obscured by its surroundings. Such a function can be realized without modifying the standard software configuration of the smartphone, and can be activated entirely with keycode commands in automated scripts issued by the keyboard.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A touch type keyboard having a unique physical location mapped to each letter of an entire alphabet comprising:
   a plurality of mechanical keys each associated with at least one rigid element and at least one capacitive sensor, which keys move at least 1.0 mm responsive to an actuation by a finger, the capacitive sensor detecting a capacitance of the finger during actuation;

an internal power source; and a wireless interface to communicate with a host;

wherein the keyboard has a deployed configuration and a collapsed configuration; and wherein a center to center spacing of adjacent keys in the array is greater than 17 millimeters, and wherein the collapsed configuration can fit within a bounding volume of less than 180 cubic centimeters.

2. The touch type keyboard of claim 1:

wherein the key board has a footprint on a work surface in the deployed configuration of less than 180 square centimeters.

3. The touch type keyboard of claim 1 having a maximum height above a work surface, in the deployed configuration, of less than 9 mm.

4. The touch type keyboard of claim 1 wherein a key has a maximum height above a work surface, in the deployed configuration, of less than 5 mm more than the mechanical travel of the key.

5. The keyboard of claim 1 wherein the mechanical keys comprise:

a first array of keys mounted on a first substrate;

a second array of keys mounted on a second substrate.

6. The keyboard of claim 5 wherein the first and second array are dissociable such that when dissociated no physical interconnection exists between the arrays.

7. The keyboard of claim 5 further comprising:

a connector having no interleaved hinge, the connector to hold the arrays together in the deployed configuration.

8. The keyboard of claim 1 wherein a maximum cross dimension of the keyboard in the collapsed configuration is less than 130 mm.

9. A touch type keyboard comprising:

a plurality of mechanical keys each containing at least one rigid element, which keys move at least 1.0 mm responsive to an actuation by a finger, the mechanical keys having a first array of keys mounted on a first substrate and a second array of keys mounted on a second substrate wherein each array has a magnetic mass within the array, the respective magnetic masses from each array interacting together to retain the keyboard in the collapsed configuration and causing the keys to reside in a down state when the keyboard is in the collapsed configuration;

an internal power source; and a wireless interface to communicate with a host;

wherein the keyboard has a deployed configuration and a collapsed configuration, and wherein the collapsed configuration can fit within a bounding volume of less than 180 cubic centimeters.

10. A touch type keyboard having a deployed and collapsed configuration, the keyboard comprising:

a plurality of mechanical keys each containing at least one rigid element, which keys move at least 1.0 mm responsive to an actuation by a finger the keys divided between at least a first array and a second array;

a connector having no interleaved hinge, the connector to hold the arrays together in the deployed configuration and provide a signaling path between the first array and the second array;

an internal power source; and a wireless interface to communicate with a host; and wherein the collapsed configuration can fit within a bounding volume of less than 180 cubic centimeters.

11. A touch type keyboard comprising:

a plurality of mechanical keys each containing at least one rigid element, which keys move at least 1.0 mm responsive to an actuation by a finger the mechanical keys distributed such that a first array resides on a first substrate and a second array of keys resides on a second substrate, an internal power source; and a wireless interface to communicate with a host;

wherein the keyboard has a deployed configuration and a collapsed configuration, and wherein the collapsed configuration can fit within a bounding volume of less than 180 cubic centimeters;

an element that provides space bar functions that is physically dissociable from the first and second arrays.

* * * * *